United States Patent
Watson et al.

(10) Patent No.: US 9,120,677 B2
(45) Date of Patent: Sep. 1, 2015

(54) BULK PREPARATION OF HOLEY GRAPHENE VIA CONTROLLED CATALYTIC OXIDATION

(71) Applicants: National Institute of Aerospace Associates, Hampton, VA (US); U.S.A., as represented by the Administrator of the National Aeronautics and Space Administration, Washington, DC (US)

(72) Inventors: Kent Watson, New Kent, VA (US); Yi Lin, Yorktown, VA (US); Sayata Ghose, Sammamish, WA (US); John Connell, Yorktown, VA (US)

(73) Assignees: National Institute of Aerospace Associates, Hampton, VA (US); The United States of America as represented by the Administration of NASA, Washington, DC (US)

( * ) Notice: Subject to any disclaimer, the term of this patent is extended or adjusted under 35 U.S.C. 154(b) by 0 days.

(21) Appl. No.: 13/986,105

(22) Filed: Apr. 1, 2013

(65) Prior Publication Data
US 2013/0315816 A1 Nov. 28, 2013

Related U.S. Application Data

(60) Provisional application No. 61/618,964, filed on Apr. 2, 2012.

(51) Int. Cl.
C01B 31/02 (2006.01)
C01B 31/04 (2006.01)
(Continued)

(52) U.S. Cl.
CPC ............. *C01B 31/0484* (2013.01); *B82Y 30/00* (2013.01); *B82Y 40/00* (2013.01); *C01B 31/00* (2013.01);
(Continued)

(58) Field of Classification Search
CPC . B82Y 40/00; C01B 31/0484; C01B 31/0438
USPC ........................ 423/448, 445 B, 460; 977/755
See application file for complete search history.

(56) References Cited

U.S. PATENT DOCUMENTS 7,001,581 B2 * 2/2006 Kawakami et al. ........ 423/447.3

OTHER PUBLICATIONS

Flexible Holey Graphene Paper Electrodes with Enhanced Rate Capability for Energy Storage Applications Xin Zhao, Cary M. Hayner, Mayfair C. Kung, and Harold H. Kung ACS Nano 2011 5 (11), 8739-8749.*

(Continued)

*Primary Examiner* — Richard M Rump
(74) *Attorney, Agent, or Firm* — Kimberly A. Chasteen

(57) ABSTRACT

A scalable method allows preparation of bulk quantities of holey carbon allotropes with holes ranging from a few to over 100 nm in diameter. Carbon oxidation catalyst nanoparticles are first deposited onto a carbon allotrope surface in a facile, controllable, and solvent-free process. The catalyst-loaded carbons are then subjected to thermal treatment in air. The carbons in contact with the carbon oxidation catalyst nanoparticles are selectively oxidized into gaseous byproducts such as CO or $CO_2$, leaving the surface with holes. The catalyst is then removed via refluxing in diluted nitric acid to obtain the final holey carbon allotropes. The average size of the holes correlates strongly with the size of the catalyst nanoparticles and is controlled by adjusting the catalyst precursor concentration. The temperature and time of the air oxidation step, and the catalyst removal treatment conditions, strongly affect the morphology of the holes.

23 Claims, 17 Drawing Sheets

(51) Int. Cl.

| | |
|---|---|
| C01B 31/00 | (2006.01) |
| B82Y 30/00 | (2011.01) |
| B82Y 40/00 | (2011.01) |
| D01F 9/12 | (2006.01) |

(52) U.S. Cl.
CPC .......... *C01B 31/026* (2013.01); *C01B 31/0213* (2013.01); *C01B 31/0253* (2013.01); *C01B 31/043* (2013.01); *D01F 9/12* (2013.01)

(56) References Cited

OTHER PUBLICATIONS

"Hole." Merriam-Webster.com. Merriam-Webster, n.d. Web. Apr. 2, 2014. <http://www.merriam-webster.com/dictionary/hole>.*
Severin, N., et al. "Rapid trench channeling of graphenes with catalytic silver nanoparticles." Nano letters 9.1 (2008): 457-461.*
Jingwei Bai. et al, Graphene Nanomesh, Nature Nanotechnology, vol. 5, pp. 190-194, Mar. 2010.
Alexander Sinitskii, et al., Patterning Graphene through the Self-Assembled Templates: . . . , J. AM. Chemical Society, vol. 132, No. 42, pp. 14730-14732, Jun. 2010.
Xiaogan Liang, et al., Formation of Bandgap and Subbands in Graphene Nanomeshes . . . , AM. Chemical Society, Nanoletters, pp. 2454-2460, Jun. 2010.
Omid Akhavan, Graphene Nanomesh by ZnO Nanorod Photocatalysts, ACSNANO, vol. 4, No. 7, pp. 4174-4180, Jun. 2010.
Xin Zhao, et al., Flexible Holey Graphene Paper Electrodes with Ehnaced Rate Capability for Energy Storage Applications, ACSNANO, vol. 5, No. 11, pp. 8739-8749, Oct. 2011.
Xin Zhao, et al., In-Plane Vacancy-Enabled High-Power Si-Graphene Composite . . . , Advanced Energy Materials, pp. 1079-1084, Oct. 2011.
Tae Hee Han, et al., Steam Etched Porous Graphene Oxide Network for Chemical Sensing, J. AM. Chemical Society, 133, pp. 15264-15267, Sep. 2011.
Zhiyuan Zeng, et al., Fabrication of Graphene Nanomesh by Using an Anodic Aluminum Oxide Membrane as a Template, Advanced Materials, 24, pp. 4138-4142, Apr. 2012.
Jinyang Liu, et al., Fabrication of Graphene Nanomesh and Improved Chemical Enhancement for Raman Spectroscopy, Journal of Physical Chemistry, 116, pp. 15741-15746, Jun. 2012.
Rajat Kanti Paul, et a., Graphene Nanomesh as High Sensitive Chemiresistor Gas Sensor, Analytical Chemistry, 84, pp. 8171-8178. Aug. 2012.
Min Wang, et al., CVD Growth of Large Area Smooth-edged Graphene Nanomesh . . . , Scientific Reports 3, 1238 pp. 1-6 Feb. 2013.
Gregg P. Kotchey, et al., The Enzymatic Oxidation of Graphene Oxide, ACSNANO, vol. 5, No. 3 pp. 2098-2108, Feb. 2011.

* cited by examiner

Figure 1A
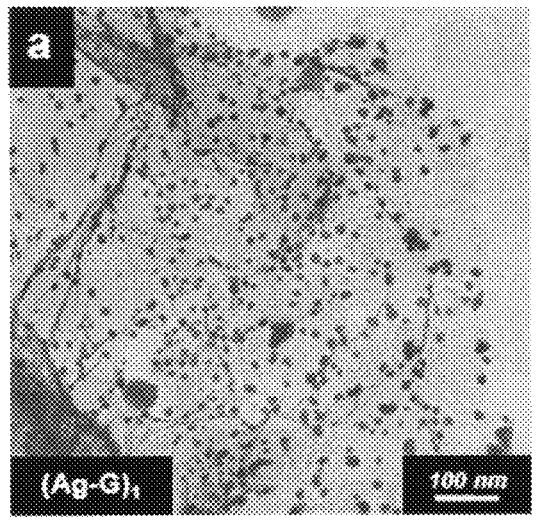
Figure 1B
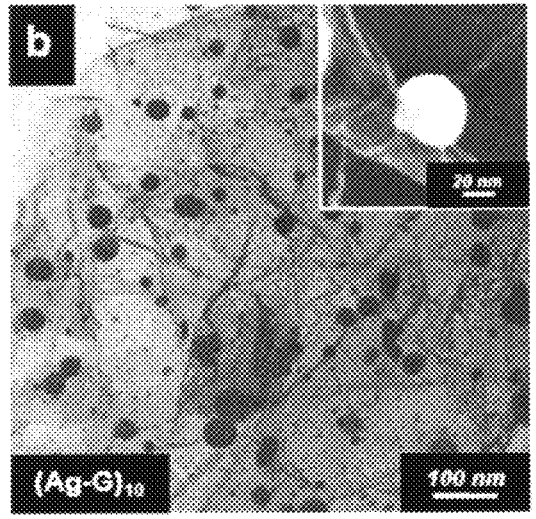
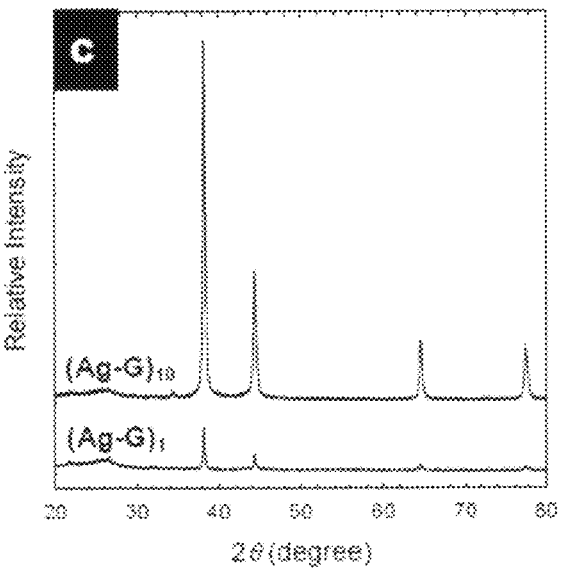
Figure 1C
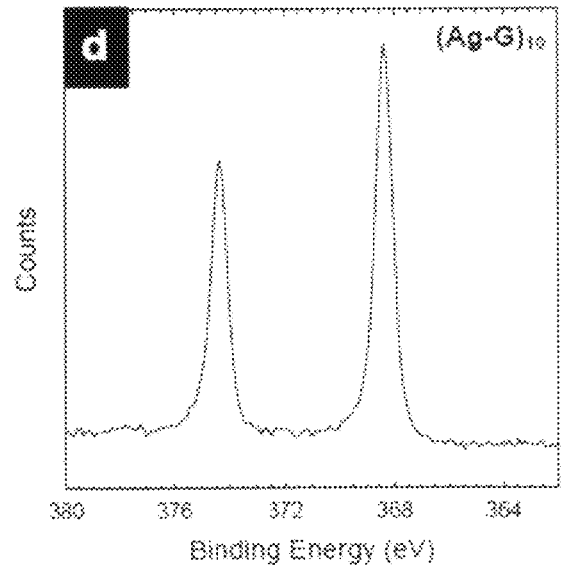
Figure 1D

Figure 2A
Figure 2B
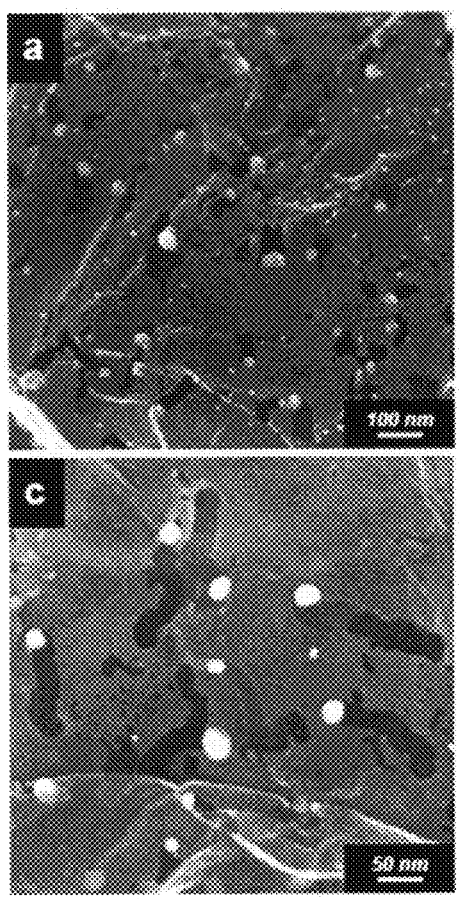
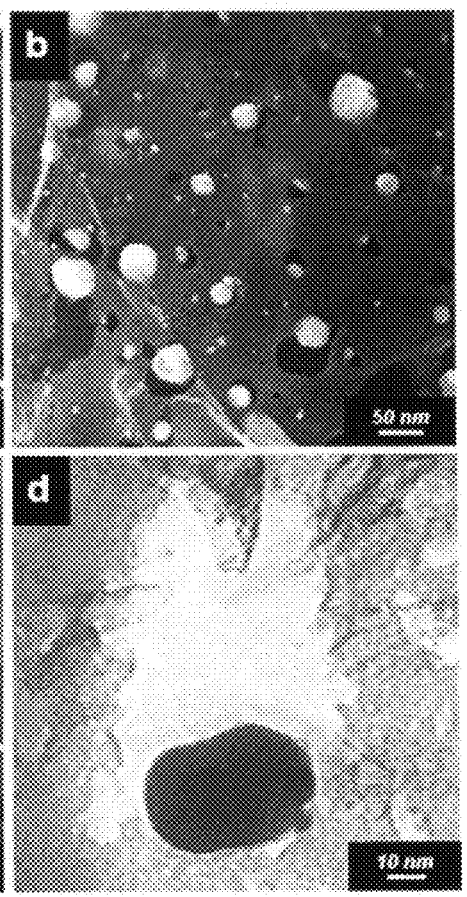
Figure 2C
Figure 2D

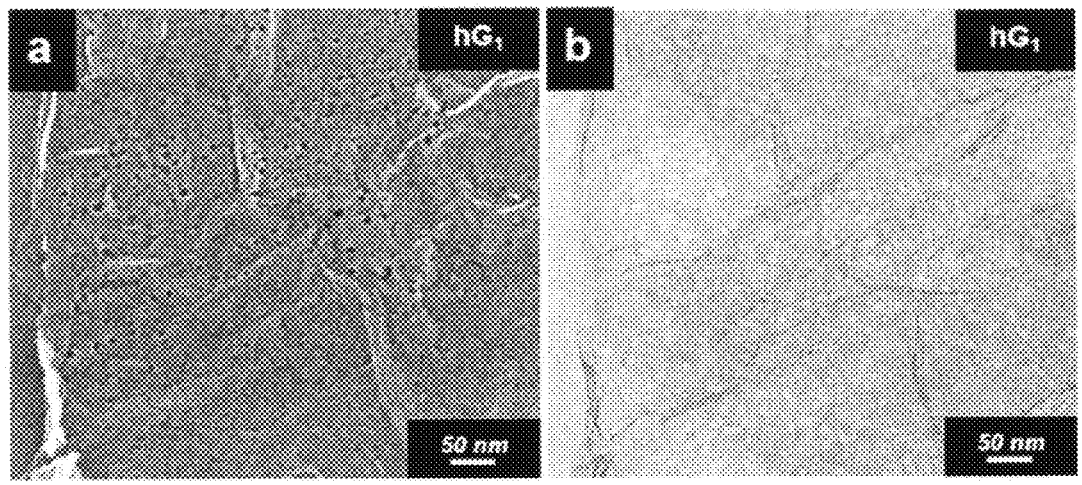
Figure 6A                    Figure 6B
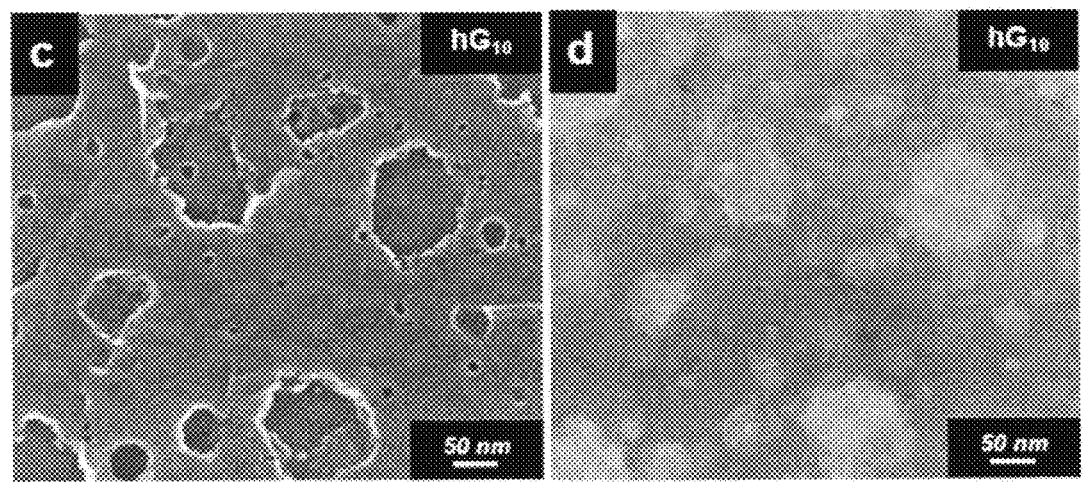
Figure 6C                    Figure 6D

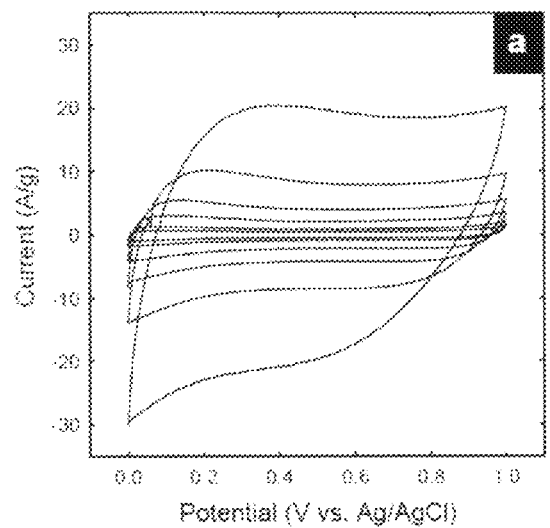
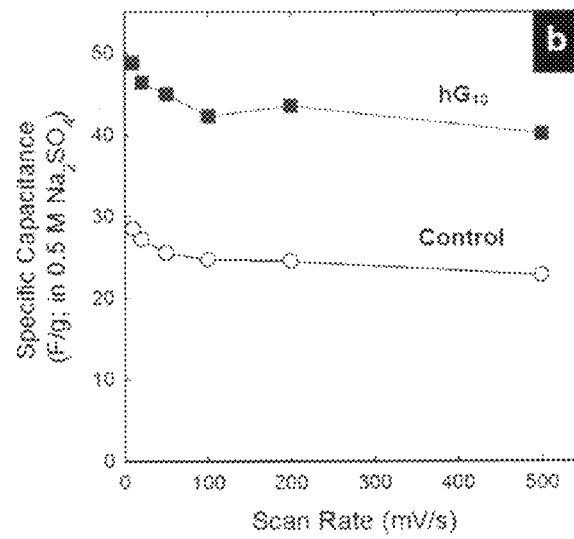
Figure 13A
Figure 13B
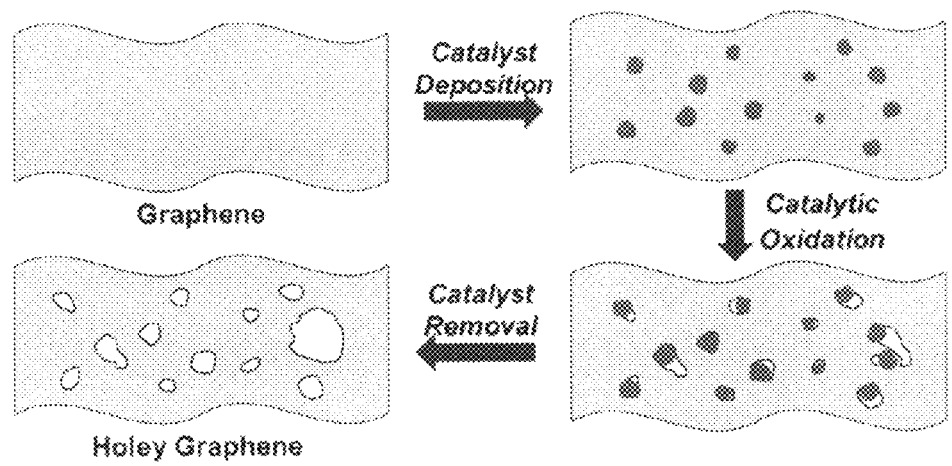
Figure 14

BULK PREPARATION OF HOLEY GRAPHENE VIA CONTROLLED CATALYTIC OXIDATION

CROSS REFERENCE TO RELATED APPLICATION

This Application claims the benefit of U.S. Provisional Application No. 61/618,964 filed on Apr. 2, 2012 for "BULK PREPARATION OF HOLEY CARBON ALLOTROPES."

STATEMENT REGARDING FEDERALLY SPONSORED RESEARCH OR DEVELOPMENT

The invention described herein was made in the performance of work under a NASA cooperative agreement and by employees of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the cooperative agreement recipient elected to retain title.

BACKGROUND OF THE INVENTION

1. Field of the Invention

The present invention relates to holey graphenes, graphene nanomeshes, holey carbon nanotubes, or holey carbon nanofibers, and, more particularly to holey graphenes, graphene nanomeshes, holey carbon nanotubes, or holey carbon nanofibers formed by controlled catalytic oxidation.

2. Description of Related Art

All references listed in the appended list of references are hereby incorporated by reference, however, as to each of the above, to the extent that such information or statements incorporated by reference might be considered inconsistent with the patenting of this/these invention(s) such statements are expressly not to be considered as made by the applicant(s). The reference numbers in brackets below in the specification refer to the appended list of references.

Graphene sheets are two-dimensional, conjugated carbon structures which are only one or a few atoms thick. They are currently among the most studied nanomaterials for potential applications in electronics, energy harvesting, conversion, and storage, polymer composites, and others.[1-4] Graphene sheets with the most ideal structures are experimentally obtained via mechanical exfoliation (the "Scotch Tape" method), which only produces very small quantities.[1] For the bulk preparation of graphene, one of the most popular methods usually starts with strong oxidation of natural graphite into graphene oxide (GO) that is dispersible in aqueous solutions as an exfoliated monolayer or few-layered sheets.[3] The exfoliated GO sheets may then be chemically or thermally converted into graphene—or more accurately "reduced graphene oxide" (rGO). Compared to the graphene sheets prepared from mechanical exfoliation or chemical vapor deposition methods, chemically exfoliated rGO sheets usually have more defects.[3,5,6]

Nevertheless, graphene sheets prepared from any method always contain intrinsic defects. Typical types of defects on graphene surface are Stone-Wales (pentagon-heptagon pairs) or vacancy sites, which are mostly of nanometer sizes.[5,6] Recently, there have been a few reports on novel types of graphene structures which are featured with large pore openings (i.e., holes) on the conjugated carbon surface.[7-18] Compared to conventionally termed defects that often take extensive efforts to observe using high-resolution microscopic techniques,[5] the pore openings in these novel holey graphene (hG) structures are much larger (ranging from a few to hundreds of nanometers) and are thus easily identified. The hG structures obtained from lithographic methods, often referred to as "graphene nanomeshes", usually had spherical hole geometry with controlled sizes.[7-14] For example, Bai et al. took advantage of phase-segregated domains of polystyrene-poly(methyl methacrylate) diblock copolymers and used them as the starting templates for the lithographic preparation of secondary $SiO_2$ nanomesh masks via reactive ion etching.[7] The porous $SiO_2$ mask, on top of a graphene flake, was then placed under oxygen plasma for the removal of exposed carbon atoms underneath. This resulted in supported or free-standing (upon lift-off) graphene nanomeshes with spherical holes of a few to tens of nm in diameter with various periodicities.

In another example, Liang et al. reported a very similar lithographic process but with the use of a porous polystyrene resist layer obtained with the use of an imprint template.[9] The periodic holes on the graphene nanomeshes induced interesting tunable semiconducting properties that may result in transistor devices for unique electronic applications.

A great obstacle for the nearly perfectly structured "graphene nanomeshes" in applications beyond electronics is that they can be only prepared on a substrate-level and are not readily scalable. Alternatively, hGs could be obtained from oxidative methods in larger quantities, despite somewhat less controlled hole geometries, periodicities and size distributions than the graphene nanomeshes.[15-18] For example, Kung and coworkers reported that the sonication of an aqueous mixture of dispersed GO and concentrated nitric acid resulted in GO sheets (and upon reduction, rGO sheets) with holes of various sizes.[15,16] Such hG films obtained via filtration showed high performance in lithium ion storage, which was attributed to enhanced ion diffusion channels due to the holes on the graphitic surface. In another report, Star and coworkers found that a mild enzyme treatment using horseradish peroxidase could catalyze the oxidation of GO, resulting in holey GO sheets with hole sizes gradually increased over the course of the reactions (up to a few weeks).[17] It was interesting that the same enzyme treatment was ineffective toward rGO, which were attributed to less dynamic enzyme functions.

It is a primary aim of the present invention to provide carbon allotropes or graphene nanomeshes.

It is an object of the invention to provide carbon allotropes formed by controlled catalytic oxidation.

It is an object of the invention to provide carbon allotropes in scalable quantities.

It is an object of the invention to provide carbon allotropes with minimal defects.

It is an object of the invention to provide a facile and well controllable method for preparing carbon allotrope structures, which contain holes on the surfaces etched via catalytic oxidation of graphitic carbon by deposited metallic nanoparticles, such as silver (Ag), gold (Au), or platinum (Pt) nanoparticles, or metallic oxide nanoparticles, or combinations thereof.

It is a further object of the invention to provide a method for preparing carbon allotrope structures which has controlled hole sizes on the graphitic surface.

It is a further object of the invention to provide a method for preparing carbon allotrope structures which is readily scalable.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a method for forming holey graphenes by a controlled catalytic oxidation of the graphene surface using metallic or metal oxide nanoparticles. The method includes the steps of providing a carbon allotrope in solid form, depositing carbon oxidation catalyst nanoparticles on the surface of the carbon allotrope sheet in a facile, controllable, and solvent-free process to yield an carbon oxidation catalyst-carbon allotrope material, subjecting the resulting carbon oxidation catalyst-carbon allotrope material to a thermal treatment in air, selectively oxidizing the carbons in contact with the carbon oxidation catalyst nanoparticles into gaseous byproducts, and removing the carbon oxidation catalyst nanoparticles such that the holes remain in the surface of the carbon allotrope. The carbon allotrope is preferably graphene, graphene oxide, reduced graphene oxide, thermal exfoliated graphene, graphene nanoribbons, graphite, exfoliated graphite, expanded graphite, single-walled carbon nanotubes, double-walled carbon nanotubes, multi-walled carbon nanotubes, carbon nanofibers, carbon fibers, carbon black, amorphous carbon, or fullerenes. The carbon oxidation catalyst may be a transition metal, a rare earth metal, an oxides, or a combination thereof. Most preferably, The carbon oxidation catalyst is Fe, Co, Ni, Ru, Rh, Pd, Os, Ir, Pt, Cu, Ag, or Au. In a preferred embodiment, the carbon oxidation catalyst nanoparticle -carbon allotrope is prepared by heating a mixture of a metal salt precursor and a carbon allotrope at an elevated temperature whereby the metal salt precursor is decomposed in an inert atmosphere with the elevated temperature being between 100 to 500° C. and most preferably 350° C. The metal salt precursor is preferably a compound with organic groups or inorganic groups and more preferably metal acetate, metal acetylacetonate, metal nitrate, metal halides, or combinations thereof. The heating may be provided by energy input such as thermal, electrical, mechanochemical, electrochemical, electron bombardment, ion bombardment, electromagnetic, or combinations of those. In a preferred embodiment, the carbon oxidation catalyst nanoparticle is in a concentration of between 0.1 mol % and 20 mol %. The oxidation step preferably occurs at a temperature between 150° C. and 500° C. The carbon oxidation catalyst nanoparticles may preferably be removed by treatment in acid at temperatures between ambient and the temperature to reflux the acid and the acid is most preferably nitric acid, hydrochloric acid, sulfuric acid, acetic acid, chlorosulfonic acid, phosphorous acid or combinations thereof. The resulting holey carbon allotrope is incorporated into an electrode as a platform for an electrochemical device. Electrodes may be prepared according to the method described herein. In particular, this method may be use to form hole graphene by providing a graphene sheet and depositing Ag nanoparticles on the surface of the graphene sheet. In this particular embodiment, the steps are as set out previously. The Ag nanoparticles are in the form of metallic silver in a concentration of between 0.1 mol % and 20 mol %. The Ag nanoparticles are removed by treatment in diluted nitric acid at temperatures between ambient and the temperature to reflux the acid.

BRIEF DESCRIPTION OF THE DRAWINGS

A more complete description of the subject matter of the present invention and the advantages thereof, can be achieved by reference to the following detailed description by which reference is made to the accompanying drawings in which:

FIG. 1a shows a TEM image of $(Ag-G)_1$ samples;

FIG. 1b shows a TEM image of $(Ag-G)_{10}$ samples, the inset is a SEM image showing the flat interface morphology of a Ag nanoparticle on a graphene sheet;

FIG. 1c shows XRD patterns of the same samples: $(Ag-G)_1$ (bottom) and $(Ag-G)_{10}$ (top);

FIG. 1d shows an XPS spectrum in the Ag 4d core level region for the $(Ag-G)_{10}$ sample;

FIG. 2a shows a lower magnification SEM image of a $(Ag-G)_{10}$ sample subjected to air oxidation at 300° C. for 3 hours showing both holes and tracks;

FIG. 2b shows SEM images of a $(Ag-G)_{10}$ sample subjected to air oxidation at 300° C. for 3 hours showing areas enriched with lower aspect ratio holes;

FIG. 2c shows SEM images of a $(Ag-G)_{10}$ sample subjected to air oxidation at 300° C. for 3 hours showing areas enriched with high aspect ratio holes (i.e., tracks);

FIG. 2d shows a TEM image at higher magnification of a $(Ag-G)_{10}$ sample subjected to air oxidation at 300° C. for 3 hours showing the morphology of a hole;

FIG. 6a shows a SEM image of a $hG_1$ sample;

FIG. 6b shows a TEM image of a $hG_1$ sample acquired at the exactly the same location as the corresponding image shown in FIG. 6a;

FIG. 6c shows a SEM image of a $hG_{10}$ sample;

FIG. 6d shows a TEM image of a $hG_{10}$ sample acquired at the exactly the same location as the corresponding image shown in FIG. 6c;

FIG. 7b shows an electron diffraction pattern taken from the area indicated in FIG. 7a;

FIG. 7c shows an electron diffraction pattern taken from the area indicated in FIG. 7a;

FIG. 7d shows an electron diffraction pattern taken from the area indicated in FIG. 7a;

FIG. 13a shows preliminary electrochemical evaluations in the form of cyclic voltammetry curves of a hG10 electrode at scanning rates from 10 (most inner curve) to 500 mV s−1 (most outer curve);

FIG. 13b shows preliminary electrochemical evaluations in the form of specific capacitance values of hG10 in comparison with those of a control graphene sample (with 2 hours nitric acid reflux only); and FIG. 14 shows the steps of the method described herein.

DETAILED DESCRIPTION OF THE PREFERRED EMBODIMENT

Figure 3A:
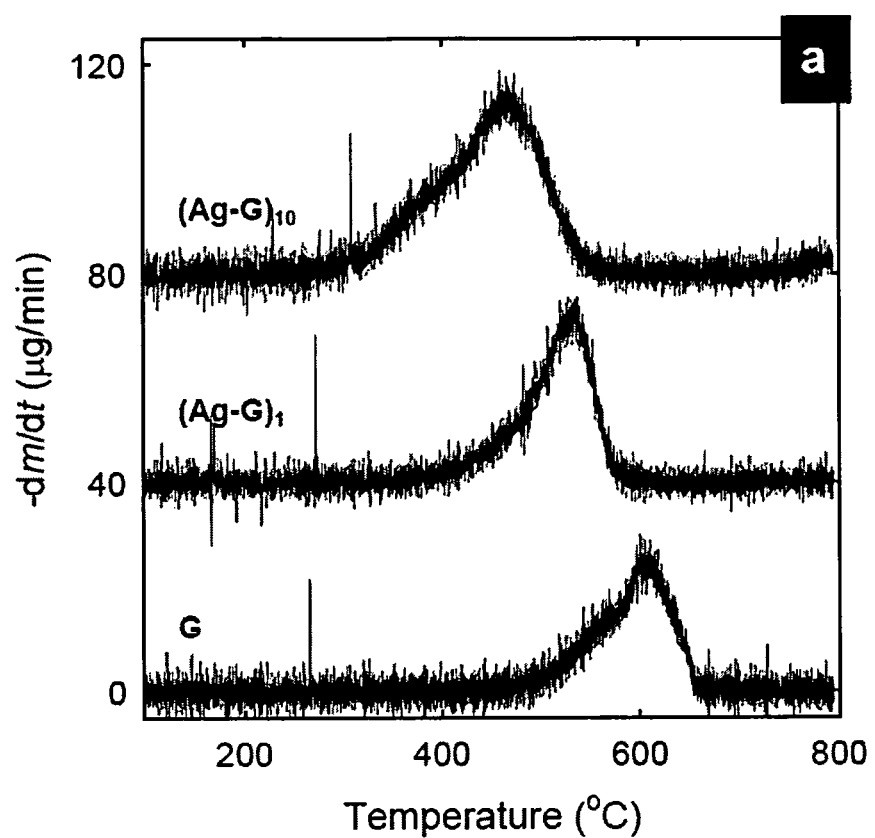
FIG. 3a shows DTG curves (air, 5.4° C./min) of the $(Ag-G)_{10}$ (top) and $(Ag-G)_1$ (middle) samples in comparison with the starting graphene sample (G, bottom)

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Structural manipulations of the two dimensional graphene surface have been of significant interest as a means of tuning the properties of the nanosheets for enhanced performance in various applications. A straightforward yet highly scalable method is described to prepare bulk quantities of "holey graphenes", which are graphene sheets with holes ranging from a few to over 100 nm in diameter. The approach to their preparation takes advantage of the catalytic properties of certain metal oxides or metals, such as silver (Ag), nanoparticles toward the air oxidation of graphitic carbons. In the procedure, Ag nanoparticles were first deposited onto the graphene sheet surface in a facile, controllable, and solvent-free process. The catalyst-loaded graphene samples were then subjected to thermal treatment in air. The graphitic carbons in contact with the Ag nanoparticles were selectively oxidized into gaseous byproducts such as CO or $CO_2$, leaving the graphene surface with holes. The Ag catalysts were then removed via refluxing in diluted nitric acid to obtain the final holey graphene products. The average size of the holes on the graphene was found to strongly correlate with the size of the Ag nanoparticles and thus could be conveniently controlled as previously established by adjusting the silver precursor concentration. In addition, the temperature and time of the air oxidation step as well as the catalyst removal treatment conditions were found to strongly affect the morphology of the holes. Characterization results of the holey graphene products suggested that the hole generation might have started from defect-rich regions present on the starting graphene sheets. As a result, the remaining graphitic carbons on the holey graphene sheets were highly crystalline, with no significant increase of the overall defect density despite the presence of structural holes. Preliminary experiments were also presented on the use of holey graphene sheets as fillers for polymeric composites. The results indicated that these sheets might be better reinforcing fillers than the starting graphene sheets due to their holey nature. Other unique potential uses of these materials are in energy storage applications.

This invention is a facile and well controllable procedure to prepare holey graphene structures, which contain holes on the graphene surfaces etched via catalytic oxidation of graphitic carbon by deposited metal oxide or metallic nanoparticles. In comparison to the afore-mentioned literature methods to prepare holey graphenes, the technique described herein is not only versatile in that it provides controlled hole sizes on the graphitic surface, but also readily scalable. This enables more convenient use of these materials in many applications that require bulk quantities, such as polymeric composites and energy storage.

In a preferred embodiment of this method, the commercially available starting graphene material is prepared from a process similar to the thermal reduction/exfoliation of GO ["thermally exfoliated graphene" (TEG)[19]]. The preparation of holey graphenes (hG) is a 3-step process from the starting graphene material, namely the catalyst deposition, the catalytic oxidation, and the catalyst removal. Detailed observations from each step are discussed below.

Step I: Catalyst Deposition. In the first step, catalytic nanoparticles, such as Ag, are deposited onto the graphene surface to yield Ag nanoparticle-decorated graphene (Ag—G). This is achieved using a solvent-free and highly scalable deposition process, which was previously established with multi-walled carbon nanotubes (MWNTs) as the supporting substrate.[20-22] In the present method, a metal salt such as silver acetate and graphene are mixed at a desirable ratio in the solid-state and subsequently subjected to thermal treatment in a nitrogen atmosphere. Under elevated temperature (350° C.), silver acetate is thermally decomposed into Ag metal, in the form of nanoparticles with the presence of graphene as the supporting substrate, with volatile byproducts such as $CO_2$, CO, and water. The metallic Ag nanoparticles are well-distributed on the graphene surface, as shown in the transmission electron microscopy (TEM) images in FIGS. 1a and 1b. As also indicated by the microscopic results, the surface of the graphene remains intact after the reaction, with occasional defects and wrinkles, similar to that of the starting graphene sample.

Like the previously reported Ag-MWNT system,[20-22] the sizes of Ag nanoparticles in the Ag—G samples are conveniently controlled by varying the starting silver acetate to graphene ratio. Generally, larger amounts of silver acetate typically result in Ag nanoparticles of similar population but with larger average sizes. This could be attributed to the limited amount of metal anchoring sites that are likely associated with graphene surface defects. For example, the use of 1 (FIGS. 1a) and 10 mol % (FIG. 1b) silver acetate (equivalent to ~9 and 47 wt % Ag-to-C) yields graphene-supported Ag nanoparticles with average sizes of ~10 and ~21 nm, respectively. These two samples are designated as $(Ag—G)_1$ and $(Ag—G)_{10}$, respectively. The nanoparticle growth in the Ag—G samples appears to use the local graphene surface as a template, as suggested by the flat interface indicating an intimate contact between Ag nanoparticles and the graphene support. A scanning electron microscopy (SEM) image of an example with an Ag nanoparticle "sitting" on a wrinkled part of graphene is shown in the FIG. 1b inset. The contact angle between the Ag nanoparticle and the graphene surface is smaller than 90°. In other words, the diameter of the contact area is somewhat smaller than that of the Ag nanoparticle. This is typically seen for all Ag—G samples as well as those using other metal salt precursors such as gold acetate, palladium acetate, or platinum acetylacetonate.

X-ray diffraction (XRD) analysis of these samples (FIG. 1c) shows the broad graphene (002) peak at c.a. 26° and typical peaks for $Ag^0$ (ICDD 04-0783) at 38.1°, 44.3°, 64.5°, and 77.4°, corresponding to the (111), (200), (220), and (311) crystal planes, respectively. Those for silver acetate precursors (ICDD 14-0733; e.g. 29.2°) are absent, suggesting the full decomposition of silver acetate into Ag metal. The spectra from X-ray photoelectron spectroscopy (XPS) (FIG. 1d) exhibit sharp Ag $3d_{3/2}$ and $3d_{5/2}$ peaks at 374.4 and 368.4 eV, also consistent with the presence of metallic Ag.

Step II: Catalytic Oxidation. In this step, the metal oxide or metal nanoparticle decorated graphene samples are subjected to controlled air oxidation via heating in an open-ended tube furnace. For example, as shown in FIG. 2a, after treatment of a $(Ag—G)_{10}$ sample at 300° C. for 3 hours, a significant number of holes appeared on the originally intact graphene surfaces. Most of the holes are associated with at least one Ag nanoparticle. Some holes also appeared as tracks, which are apparently associated with the directional movements of the attached Ag nanoparticles under the given conditions (FIG. 2b), likely due to etching-induced motions (see more below). Nevertheless, Ag nanoparticles with larger sizes typically yield holes of larger diameters (or tracks of larger widths). Each hole or track might not have originated from only one Ag nanoparticle since those from multiple adjacent Ag nanoparticles could merge to form branched tracks (FIG. 2c) or one single hole (FIG. 2d). The procedure in Step I where nitrogen atmosphere is used could be viewed as the control reaction for Step II in which the same Ag—G material is heated in air instead. Therefore, the above observations clearly indicate that Ag nanoparticles catalyze the oxidation of the graphene carbon atoms that are in contact with them, while the carbons that are not associated with the noble metal nanoparticles remain unaffected in the graphene structure.

In fact, the catalytic role of Ag nanoparticles to the oxidation of graphitic carbon has been known for a few decades and sometimes referred to as "catalytic carbon gasification" as CO and $CO_2$ are generated in the process.[23] More recently, Severin et al. reported the formation of "trenches" on highly oriented pyrolytic graphite (HOPG) substrates, similarly induced by the etching activity of Ag nanoparticles.[24] Mechanistically, it is conceivable that the Ag-catalyzed thermal oxidation of graphene starts at the peripheral of the well-conformed Ag-graphene contact area (example shown in FIG. 1b inset) where the $O_2$ molecules have the most direct access. Since the graphene sheets are only one to a few layers in thicknesses, the catalytic oxidation of carbon on the graphene sheets is able to penetrate through all layers in most occasions.

Although the diameter of the Ag-graphene contact area is smaller than the corresponding Ag nanoparticle, the diameters of the holes (including the widths of the etching-induced tracks) could be equivalent or even slightly larger than the diameter of the corresponding Ag nanoparticles at higher oxidation degrees. This might be due to the unbalanced etching-induced motions of non-spherical Ag nanoparticles. According to Severin et al.,[24] the motions of Ag nanoparticles on graphitic surfaces should be self-rotations along with movements in a slightly spiral and sometimes zigzag fashion. The rather rough edges of the holes and tracks (FIGS. 2c and 2d) might also have originated from such unbalanced movements of Ag.

Figure 11:
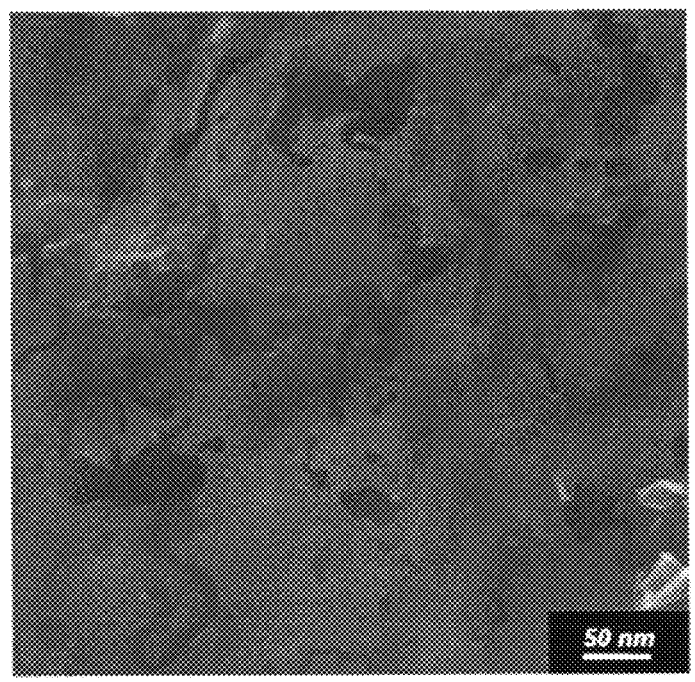
FIG. 11 shows a SEM image of a $(Ag-G)_{10}$ sample subjected to thermal treatment at 300° C. in air for 10 hours.

The lengths of the observed tracks vary from a few tens of nm to more than 100 nm for the sample shown in FIGS. 2a-2d. However, there seems to be no clear dependence of the track length on the size of the corresponding Ag nanoparticle, which varies from sheet to sheet and sometimes even on the same sheet. Several parameters might have to be taken into account to understand this. For example, the local oxygen availability in the heated solid sample (sheet-to-sheet difference) and the local surface defect structure of the given graphene sheet (difference within the same sheet) should be among the critical factors. Nevertheless, Ag—G samples that are subjected to longer oxidation treatments tend to have longer tracks, corresponding to higher oxidation extent (see FIG. 11 showing very long and irregular Ag-etched tracks indicating that most catalytic Ag nanoparticles in this region had probably dissociated from the graphene sheet).

Ag-induced catalytic oxidation of graphene was also investigated using thermal analysis methods, such as thermogravimetric analysis (TGA) and differential thermogravimetric analysis (DTG). For consistent comparison, in this method, the heating rate is kept at 5.4° C./min and the air flow rate is at 50 mL/min. As shown in the DTG traces in FIG. 3a, in the absence of Ag nanoparticles, the control sample consisting of the starting graphene do not exhibit weight loss until ~470° C. while the peak of weight loss occurs at ~605° C. After deposition of Ag nanoparticles, the weight loss threshold significantly reduces to ~370° C. (peak at 534° C.) for a $(Ag—G)_1$ sample and further to ~250° C. (peak at 468° C.) for a $(Ag—G)_{10}$ sample. These results indicate that Ag nanoparticles act as catalysts and reduce the activation energy of graphene oxidation so that it occurs at a much lower temperature. The fact that a higher Ag loading results in a more reduced decomposition threshold is understandable as more graphene surface is in contact with larger-sized Ag nanoparticles.

Figure 3B:
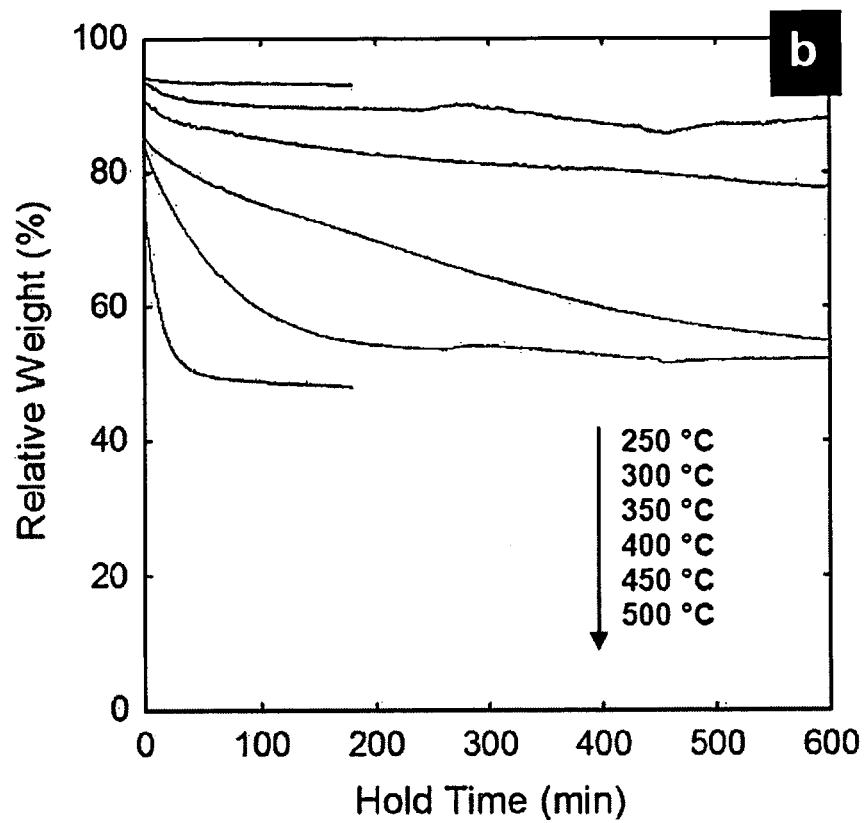
FIG. 3b shows the isothermal regions of the TGA traces of the same $(Ag-G)_{10}$ sample heated to and held at the denoted temperatures (from top to bottom: 250, 300, 350, 400, 450, 500° C.) in air for 3-10 h.

To further investigate the effect of catalytic oxidation temperature, the same $(Ag—G)_{10}$ sample is heated to temperatures between 250 and 500° C. with the same heating rate (5.4° C./min) and isothermally held for 3-10 hours. As shown in the isothermal part of the TGA curves (FIG. 3b), the (Ag—G)$_{10}$ sample exhibits different rates of weight loss at various hold temperatures. In particular, at lower temperatures (350° C. and lower), the low oxidation rates make the isothermal curves look close to pseudo-plateaus even though the oxidation is still ongoing. This result suggests that the Ag-catalyzed graphene oxidation can be controlled at a desirable degree of carbon loss in a wide range by simply controlling the hold temperature with appropriate hold time. For example, the remaining weight percentages of the (Ag—G)$_{10}$ samples heated to 250 and 350° C. in air and held for 3 hours were 93 and 83 wt %, respectively. At 500° C., the weight loss after 3 hours is ~50 wt %, indicating that there was a nearly complete oxidation of graphene with essentially no carbon left behind considering that Ag consisted of ~47 wt % of the starting (Ag—G)$_{10}$ sample.

Figure 4A:
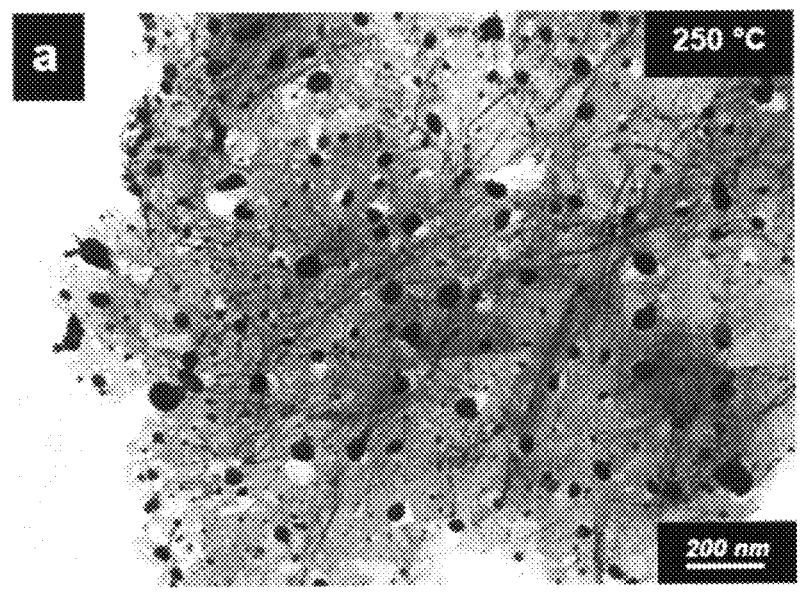
FIG. 4a shows a TEM image of the same $(Ag-G)_{10}$ sample oxidized in air at 250° C.
Figure 4B:
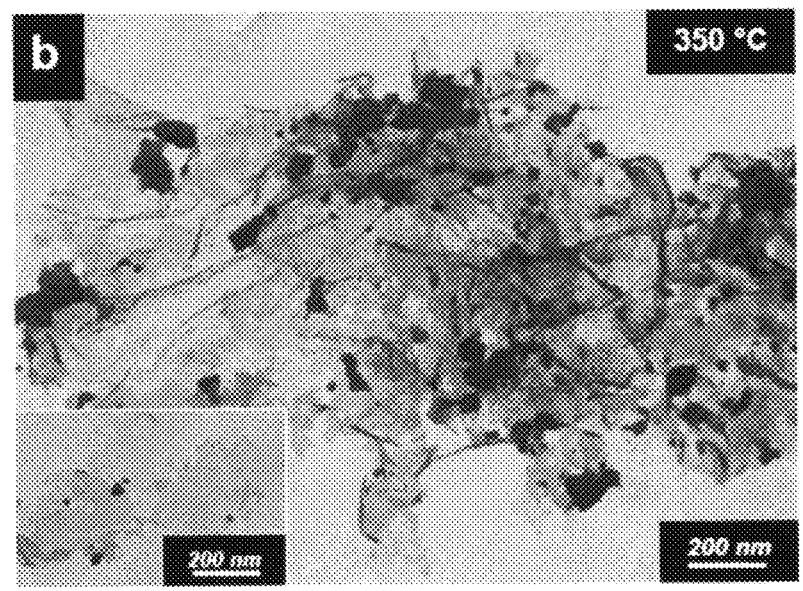
FIG. 4b shows a TEM image of the same $(Ag-G)_{10}$ sample oxidized in air at 350° C.
Figure 4C:
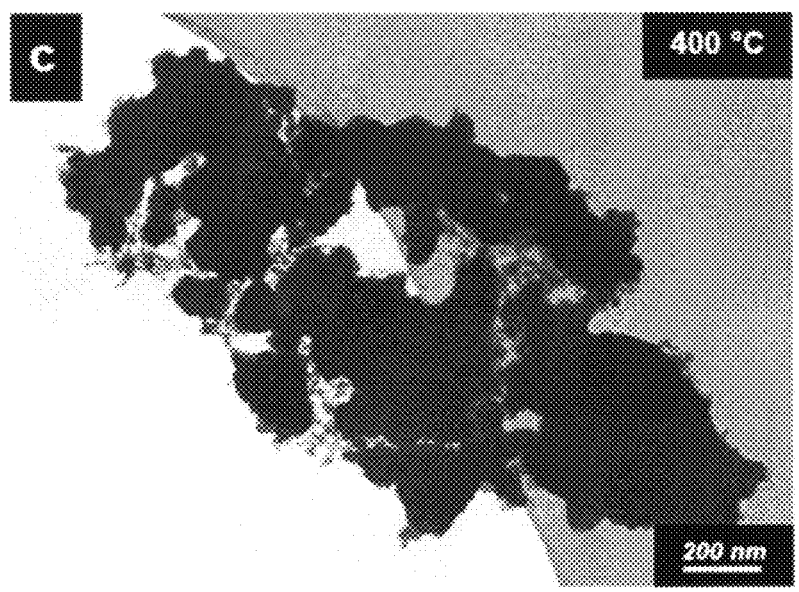
FIG. 4c shows a TEM image of the same $(Ag-G)_{10}$ sample oxidized in air at 400° C., shown in the inset are two graphene sheets with small (<500 nm) lateral dimensions as a result of catalytic oxidation.

TEM images of the (Ag—G)$_{10}$ samples treated at various temperatures are consistent with the thermal analysis results. At the same hold time of 3 hours, the sample treated at 250° C. (FIG. 4a) is quite similar to the one treated at 300° C. (FIG. 2) except for somewhat less Ag nanoparticle coalescing and shorter tracks. When treated at 350° C., the Ag nanostructures coalesce and larger holes are apparent (FIG. 4b). Many graphene sheets break into smaller pieces—mostly with lateral sizes less than 500 nm (FIG. 4b inset), while those of the original graphene sheets are usually over a few micrometers. This lateral size reduction of the graphene sheets is apparently the result from excessive oxidative etching. At treatment temperatures over 400° C., only a small amount of remaining carbon species are seen attached to large Ag clusters (FIG. 4c), suggesting the occurrence of overwhelming carbon oxidation.

Figure 5A:
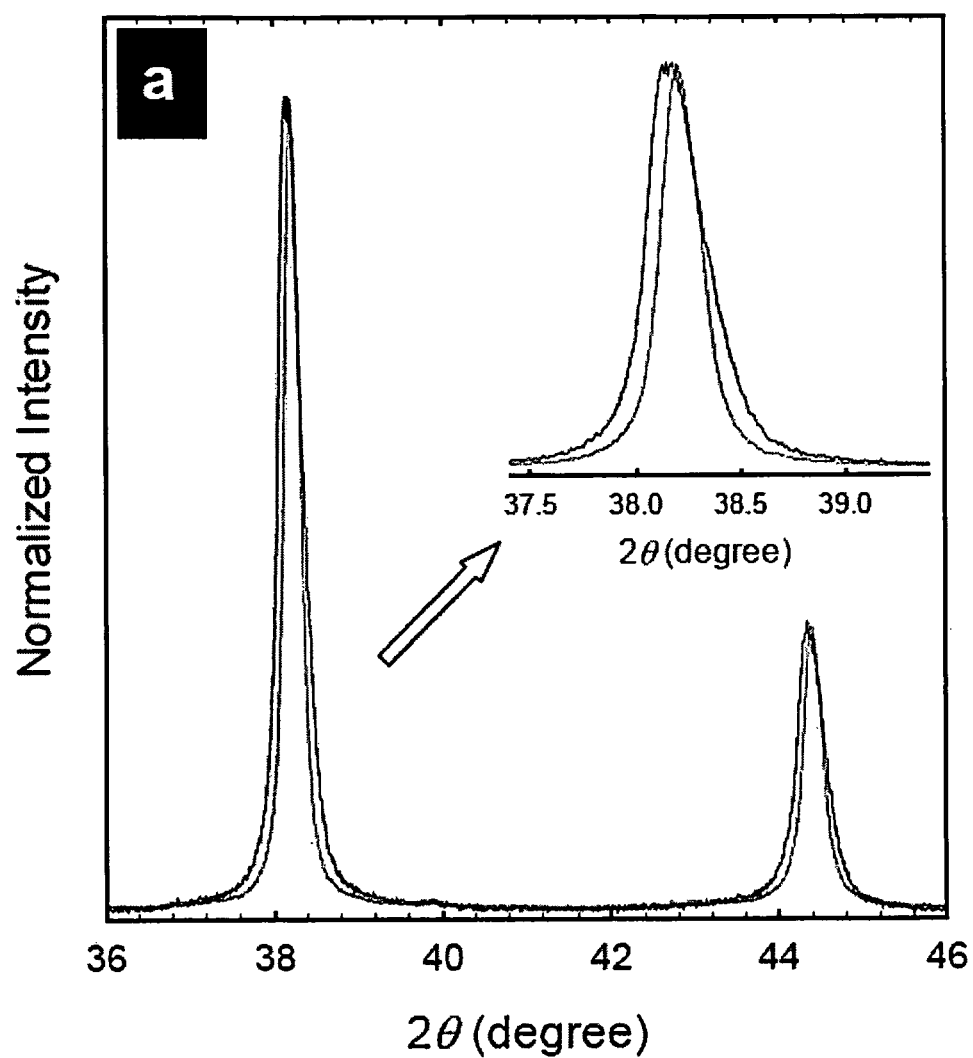
FIG. 5a shows XRD patterns of a $(Ag-G)_{10}$ sample before (black) and after (red) catalytic oxidation in air, the inset shows the enlarged Ag (111) peak region.
Figure 5B:
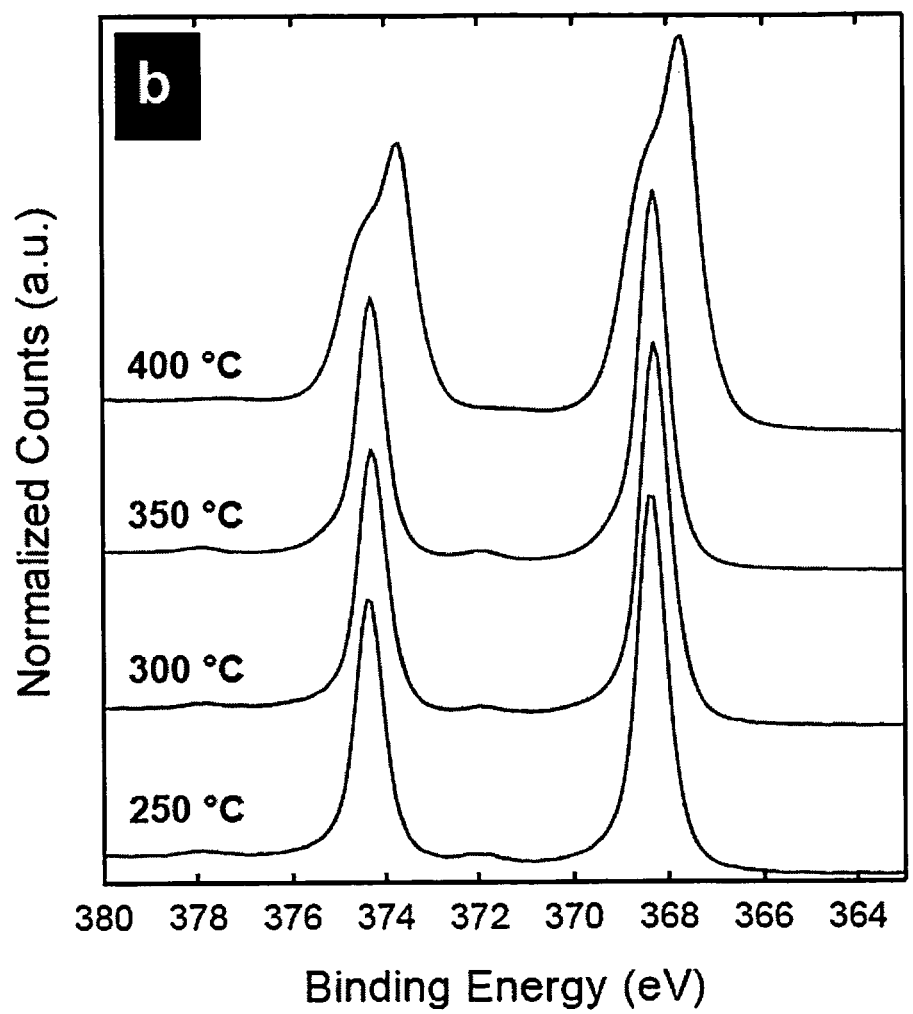
FIG. 5b shows XPS Ag 4d spectra of the same $(Ag-G)_{10}$ sample after catalytic oxidization in air at various temperatures: 250, 300, 350 and 400° C. (from bottom to top)

XRD and XPS characterization on the Ag element for the same (Ag—G)$_{10}$ samples treated at various temperatures is also consistent with the above observations. For example, XRD of the (Ag—G)$_{10}$ samples after treatment at 300° C. (FIG. 5a) shows the same Ag peaks but narrower, consistent with the increased Ag nanoparticle size due to coalescing. Interestingly, the Ag peaks also shift to higher 2θ values (e.g. by ~0.04° for (111) peak), which is likely the indication of stress release in the Ag crystalline structure upon etching away the supporting graphene that is originally in close contact.[25] In XPS (FIG. 5b), the Ag 3d signals (374.3 and 368.3 eV) exhibit little change (some marginal broadening) when the (Ag—G)$_{10}$ samples are treated in air at temperatures not higher than 350° C., suggesting the consistently active catalytic role from metallic Ag species in the temperature range. However, significant splitting of the Ag 3d signals toward lower kinetic energy value (373.7 and 367.7 eV) is observed for the sample treated at 400° C., indicating that the Ag phase was severely oxidized while a majority of the carbon was evaporated.

The use of higher oxidation temperatures (>350° C.) results in final samples of low carbon yield with high oxidative carbon content (from XPS; not shown), smaller lateral dimensions of graphene sheets, and highly irregular hole structures. Consequently, the Step III discussions below are focused on samples that are air treated at 300° C. for 3 hours.

Step III: Catalyst Removal. In order to remove the Ag catalysts, the partially oxidized Ag—G samples from Step II (oxidation temperature at 300° C.) are refluxed with diluted (2.6 M) nitric acid. The solid is then extensively washed with water followed by drying. In this process, the catalytic Ag nanoparticles are completely removed from the samples since nitric acid oxidized metallic Ag into Ag$^+$ (i.e., AgNO$_3$). The Ag salt is soluble in the aqueous dispersion and effectively removed with repeated washing. No Ag nanoparticle is found by microscopic analysis of the final products. In addition, the lack of Ag signals for these samples analyzed using both XPS and XRD confirms the complete removal of the metal.

Figure 6E:
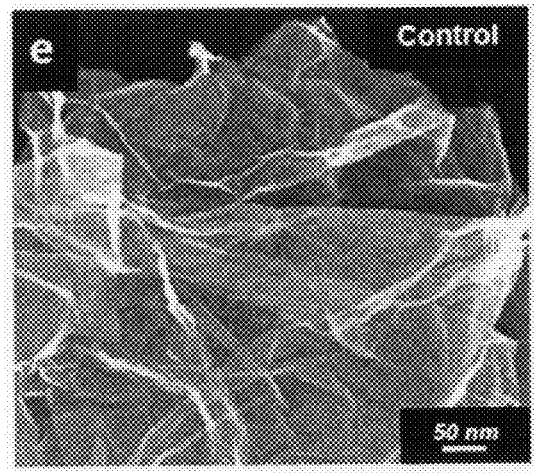
FIG. 6e shows a SEM image of a control graphene sample.
Figure 6F:
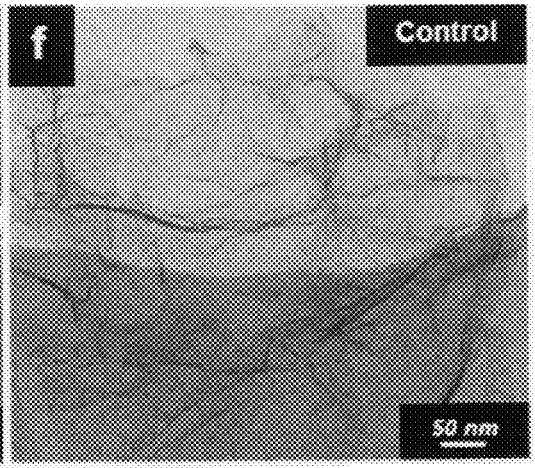
FIG. 6f shows a TEM image of a control graphene sample acquired at the exactly the same location as the corresponding image shown in FIG. 6e.

Electron microscopy images shown in FIG. 6 are from an instrument (Hitachi S-5200) that is equipped with capabilities of acquiring images under both secondary electron (SE) and transmitted electron (TE) modes (i.e., SEM and TEM) conveniently at the same area. The SEM images (FIG. 6 left side, a, c, e) emphasize the top surface morphology, while the corresponding TEM images of the same area (FIG. 6 right side, b, d, f) allow observations through the thickness of the specimens. It is apparent from these images (FIG. 6a-d) that the final samples after Step III catalyst removal exhibit distinct hole structures on the Ag-free graphitic surfaces. Therefore, these samples are referred to as "holey graphene" samples, or hGs. The holes in these samples penetrate the entire thicknesses of most hG nanosheets. The apparent hole densities of some hG sheets in TEM images are sometimes denser than those seen in the corresponding SEM images, suggesting that these sheets are more likely stacks of several sheets. As a control, a (Ag—G)$_{10}$ sample without the Step II catalytic oxidation treatment is also subjected to refluxing in nitric acid (Step III Ag-removal process). The recovered Ag-free graphene sheets, in contrast to the highly holey hG sheets, retain their original intact appearance and are apparently unaffected by this treatment (FIGS. 6e & f).

As discussed in the previous sections, higher Ag catalyst content in the Ag—G samples leads to a larger average size of the Ag nanoparticles and results in overall larger holes (including wider tracks) upon catalytic oxidation. After the nitric acid treatment to remove the Ag, the relative sizes of the holes in the hG samples inherit such dependence. For example, as shown clearly in FIG. 6, the hole sizes of the hG sample from a (Ag—G)$_{10}$ sample (designated as hG$_{10}$) ranges from ~10 to over 100 nm (~22 nm in average diameter), much larger than that of one started with (Ag—G)$_1$ (designated as hG$_1$), which is ~5 nm in average diameter. The hG$_1$ sample has a lower oxidation degree with the same treatment temperature, making its average hole size closer to the Ag-graphene contact area (smaller than the average diameter of catalytic Ag nanoparticles). In contrast, the hG$_{10}$ sample with a higher oxidation degree—due to large Ag-graphene contact area as well as lower oxidation threshold—has holes with diameters closer (and sometimes even larger due to hole merging) than the sizes of the original catalytic Ag nanoparticles. The wider size distribution of the holes in the hG$_{10}$ sample is a combined result from the initial wide distribution of the catalytic Ag nanoparticles and the inhomogeneous etching of the graphene sheets due to the irregular shapes of the catalysts as previously discussed. Nevertheless, this result demonstrates that the hole sizes of the hG samples can be controlled, to a consistent degree, by varying the loading, and thus the average size, of the catalytic Ag nanoparticles.

In comparison to the hole morphology before Ag catalyst removal (FIG. 2d), the edges around the holes in the hG samples appear to be somewhat smoother (FIG. 6). Although there are still track-like holes, their population seems to be qualitatively less than those seen from Step II. These observations indicate that the excess hot diluted nitric acid, a mildly strong oxidant, might also attack the hole edges of the air-oxidized Ag—G samples where the dangling carbons are the most vulnerable. As a result, some weakly associated carbons at the edges of the holes are removed, which occasionally induces the merging of adjacent holes. The variation of refluxing time (up to 24 hours) does not significantly affect the hole morphology of the final hG samples. In addition, simply stirring the air-oxidized Ag—G samples with the same diluted nitric acid, but at room temperature, also results in similar Ag removal and hole morphology. However, refluxing with concentrated (70%) nitric acid also removes Ag but leads to smaller sheets with diminished hole structures likely due to excessive oxidation of carbon under the much stronger oxidative condition. Nevertheless, since nitric acid is known to introduce oxygen-containing groups, such as carboxylic acids, to $sp^2$ carbon allotropes,[3,4] the flexibility of using various concentrations of nitric acid may allow fine tuning of the concentration of these functional groups for subsequent chemical modification as needed for specific applications. It is interesting to compare these observations to the catalyst-free hG preparation reported by Kung and co-workers, who sonicated GO sheets with concentrated nitric acid for hole generation.[15] Apparently, without prior catalytic air oxidation, much more severe wet oxidation conditions were required in that case, perhaps rendering the process somewhat less controllable in terms of size and morphology of the holes.

Figure 7A:
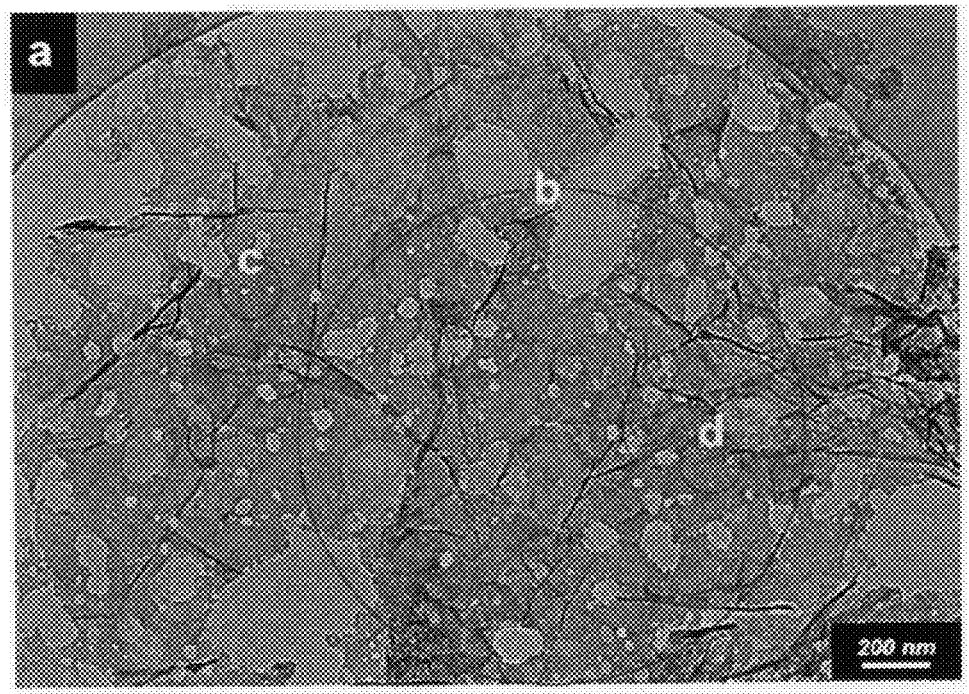
FIG. 7a shows a TEM image of a $hG_{10}$ sheet.
Figures 7B, 7C, 7D:
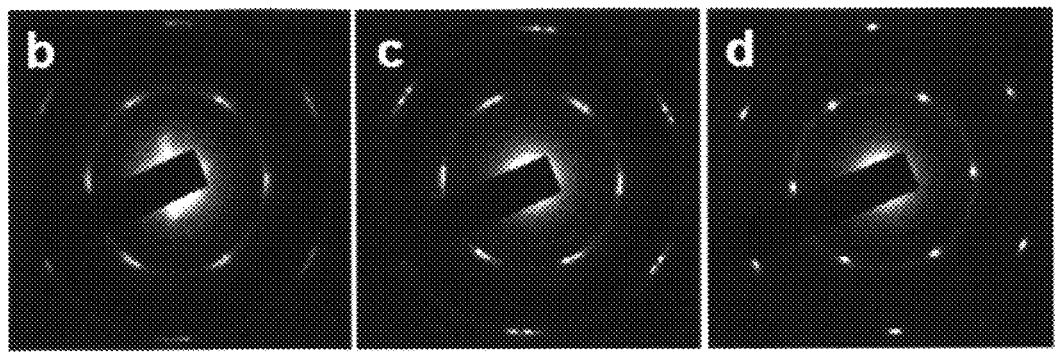

Despite the holey appearance, the remaining graphitic structures in the as-prepared hG sheets are still highly crystalline, especially when a milder nitric acid treatment is used. As shown in FIG. 7, electron diffraction patterns taken from multiple areas of a highly defined hG sheet (a $hG_{10}$ sample from 8 hours refluxing with 2.6 M nitric acid) show distinct hexagonal patterns that are similar to those from typical unmodified graphene sheets.[26] In particular, the somewhat broad pattern in FIG. 7b that corresponds to an area of ~1.5 μm in diameter is typical for graphene sheets with wrinkles and rotational stacking faults commonly seen in rGO samples.[27] The rotational stacking faults are more clearly observed in the pattern shown in FIG. 7c, which corresponds to a smaller area of ~200 nm in diameter. This pattern consists of two hexagons that are offset by ~5°, which might be attributed to the rotational fault between two well-crystallized AB-stacked graphene few-layers (the contrast of the sheet suggests that they were not likely monolayers). The electron diffraction pattern from another area of ~200 nm in diameter (FIG. 7d) only shows one hexagon set, suggesting that the local area is of perfect AB stacking order. The angle position of this single hexagon set also matches the one in FIG. 7c, indicating that the two widely separated areas (~1.5 μm in distance) originate from a single crystalline graphene sheet of long-range order.

Figure 8A:
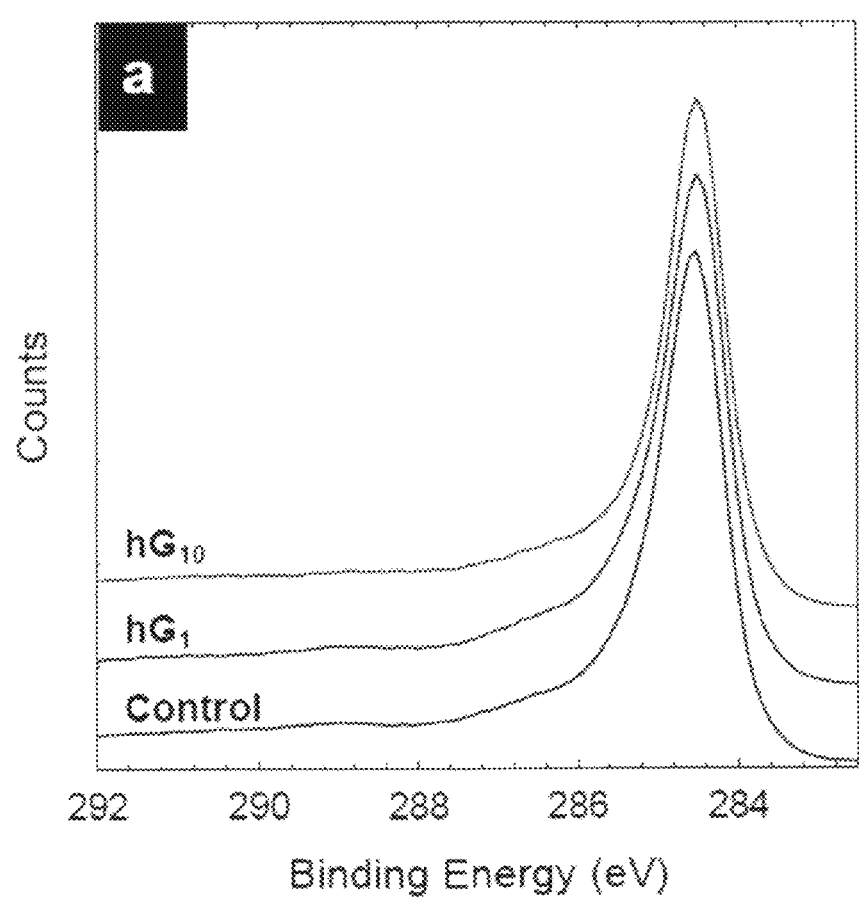
FIG. 8a shows XPS C 1s spectra of a $hG_{10}$ sample (top, red), a $hG_1$ sample (middle, blue), and a control graphene sample that was only refluxed in nitric acid under the same Step III conditions (bottom, black)
Figure 8B:
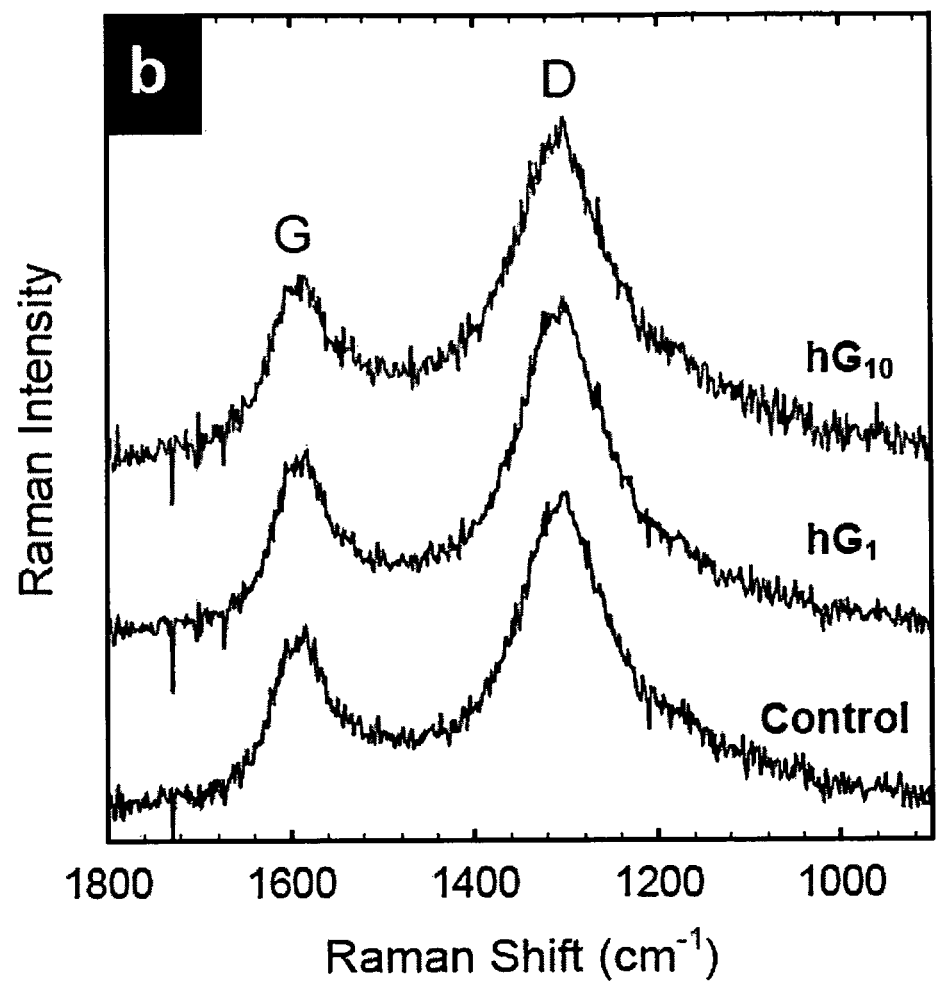
FIG. 8b shows Raman spectra of a $hG_{10}$ sample (top), a $hG_1$ sample (middle), and a control graphene sample that was only refluxed in nitric acid under the same Step III conditions (bottom)
Figure 12:
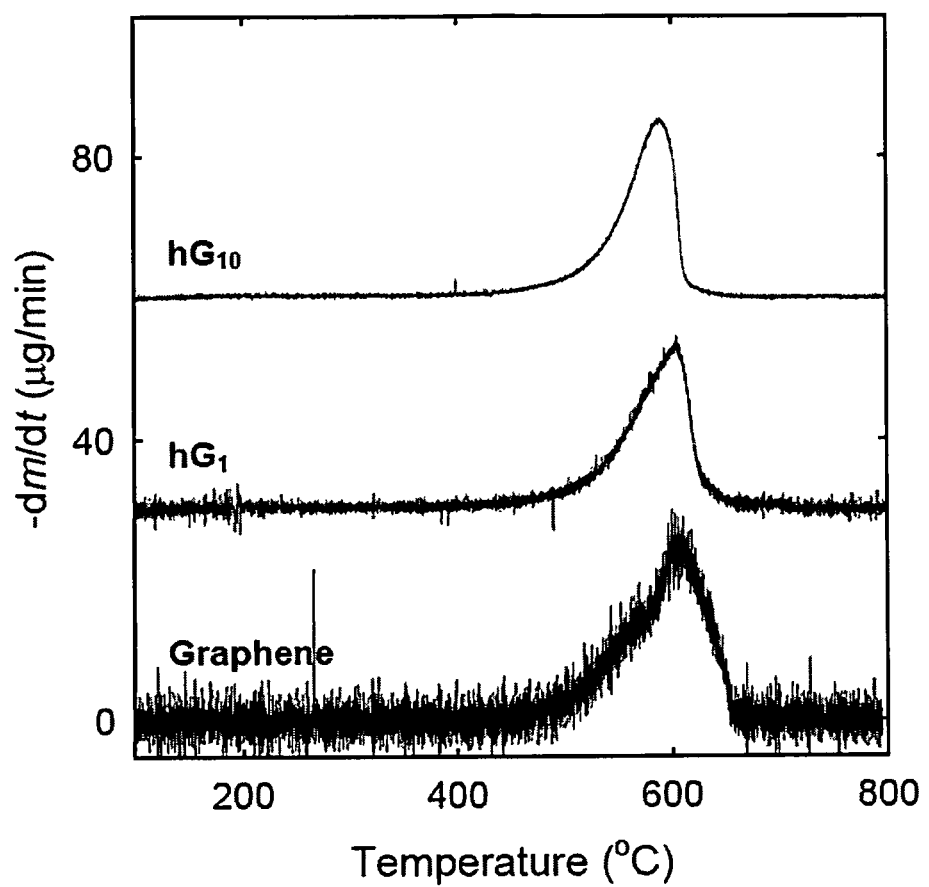
FIG. 12 shows DTG curves (air, 5.4° C./min) of the hG10 and hG1 samples in comparison with the starting graphene sample.

Various thermal and spectroscopic characterization results are also consistent with the data from electron diffraction measurements. For example, the weight loss threshold and peak temperatures of the DTG curves of $hG_1$ and $hG_{10}$ samples (see FIG. 12) nearly recover to the original values for the starting graphene sample, in clear contrast to the weight loss characteristics of the Ag-catalyzed oxidation shown in FIG. 3a. The C-1s core level signals of the XPS spectra of $hG_1$ and $hG_{10}$ samples (FIG. 8a) are almost identical to that of a control graphene sample after the same nitric acid treatment process. It is well-known that the C-1s signals of carbon species can be deconvoluted into a peak at ~284.5 eV associated with graphitic ($sp^2$) carbons and others at higher kinetic energies assigned to various oxidized carbons (e.g., C—O at ~285.9 eV, C=O at ~287.4 eV, and COO at ~289.2 eV). The lack of change in either graphitic or oxidized carbon region for the hG samples in comparison to the control sample indicates that there is little oxidation state difference for the carbons present in these samples. The Raman spectra of these samples (FIG. 8b) are also nearly identical. In particular, there is no meaningful change to the relative intensity of D-(~1305 $cm^{-1}$) and G-(~1590 $cm^{-1}$) bands or the peak positions or widths of these bands. While these parameters are all related to the relative defect concentrations of graphene samples, the lack of change in the hG samples strongly suggests that the entire process does not introduce additional defects to the overall graphitic structure. This Raman data seems different from the literature reports on hG sheets prepared from other methods,[10,17] which might be due to different etching mechanisms. Nevertheless, these characterization results are consistent with the hypothesis that the initial Ag catalyst deposition is mostly at the intrinsic defect sites of the starting graphene sheets. As such, the subsequent catalytic oxidation and nitric acid treatment also preferentially target these defect sites and nearby carbons. Thus, even after the removal of nearly 30% of carbon, upon the entire process resulting in highly holey structures with many more edge carbons, the overall "defect" (vacancy plus edge) density or the graphitic carbon content and the oxidation states remains surprisingly similar. The retained graphitic crystallinity of the hG samples in this study suggests that many important properties of the starting graphene sample, such as electron mobility, electrical conductivity, thermal conductivity, and mechanical properties, are largely preserved. It is these properties of graphene that make it such an attractive material, so the fact that the hG samples retain them is very important for their subsequent applications that are dependent upon these properties.

Figure 9A:
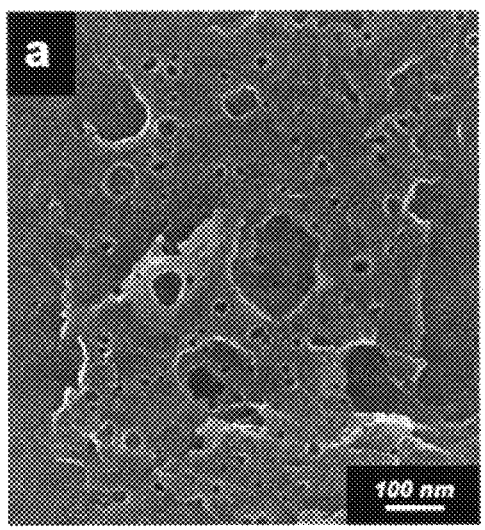
FIG. 9a shows a SEM image of a $hG_{10}$ sheet obtained from a larger scale (~2.1 g) preparation.

The above 3-step procedure to prepare hG samples is readily scalable. The first two steps are both conducted in the solid-state, so the limitations only come from the sizes of the mixing and heating devices. The last step, catalyst removal via nitric acid treatment, is a straightforward wet process that can be very conveniently scaled up to the level of multiple grams. For example, ~10 g of a $(Ag—G)_{10}$ sample (containing ~5.3 g of graphene) is subjected to catalytic air oxidation at 300° C. for 3 hours to obtain ~8.6 g of catalytically oxidized $(Ag—G)_{10}$. Subsequently, ~5.1 g of this catalytically oxidized sample iss refluxed in 2.6 M nitric acid for 8 hours and yields ~2.1 g of $hG_{10}$. The overall yield is calculated to be ~67% with regard to the weight of carbon, consistent with the yield values for hG samples prepared at smaller scales (~50-100 mg batches) under similar conditions. This large scale $hG_{10}$ product also shows comparable microscopic and spectroscopic characteristics as compared to the samples from the smaller scale batches discussed above. For example, the average hole size for the $hG_{10}$ sheets in the sample is ~20 nm (FIG. 9a), comparable to that for a sample prepared from a smaller scale (FIG. 6c). The Raman spectrum and the XPS spectrum of the sample are also very similar (not shown).

Figure 9B:
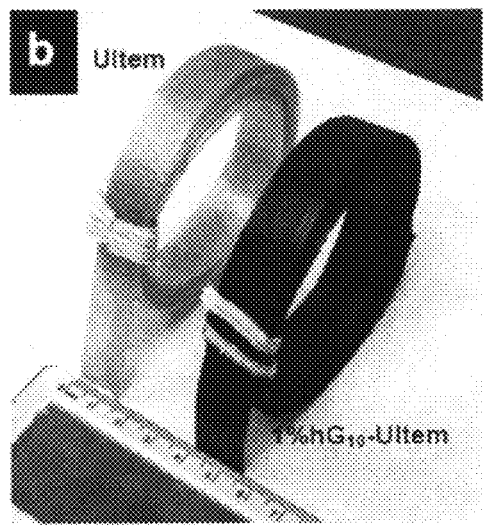
FIG. 9b shows a photo of melt-extruded ribbons of neat Ultem (golden colored) and 1% $hG_{10}$-filled Ultem composite (black colored)
Figure 9C:
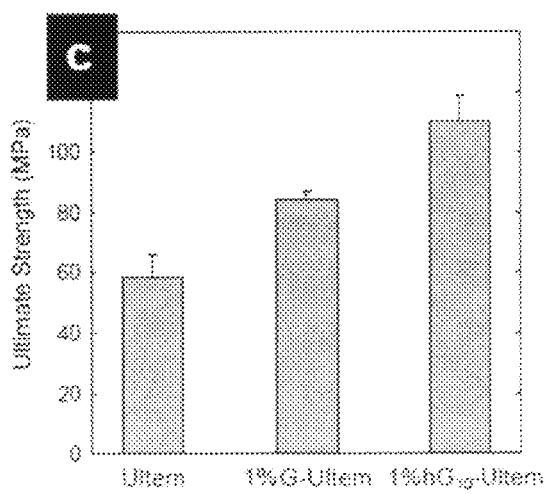
FIG. 9c shows a comparison of the ultimate strengths of neat Ultem, 1 wt % graphene-filled Ultem composite (1% G-Ultem), and 1 wt % $hG_{10}$-filled Ultem composite (1% $hG_{10}$-Ultem)
Figure 9D:
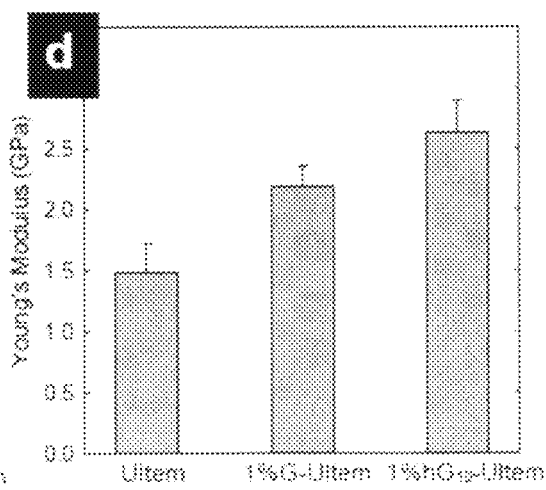
FIG. 9d shows a comparison of Young's moduli of neat Ultem, 1 wt % graphene-filled Ultem composite (1% G-Ultem), and 1 wt % $hG_{10}$-filled Ultem composite (1% $hG_{10}$-Ultem)

The large scale sample preparation allows for some evaluations of its potential as a composite filler. In an initial demonstration, an Ultem polymer (Ultem™ 1000), a melt-processable polyetherimide,[28] was used as the matrix for the melt mixing with the $hG_{10}$ nanofillers. The mixture is then extruded into continuous ribbons of ~1.9 cm in width. As shown in FIG. 9b, in comparison to the yellow colored Ultem ribbon, the composite ribbon with 1 wt % of $hG_{10}$ appears black but remains highly flexible. While the specimen processing conditions are far from optimized, it is interesting to observe that the ultimate strength and Young's modulus of the $hG_{10}$-Ultem composite ribbon not only significantly surpasses that of the neat polymer ribbon, but is also quite higher than a composite ribbon with the starting graphene fillers at the same weight content (FIGS. 9c & d). Although the hG sheets appear highly holey, this result is actually not unexpected considering that there are more sheets (in "volume") for the same carbon weight in hG-based composites due to the presence of holes, making hGs lighter materials than intact graphene. The results also indicate that the hG sheets might have largely retained, if not improved, mechanical strength in comparison to the starting graphene from composite strengthening point of view. This is likely due to the two-dimensionally crystalline nature of the remaining graphitic carbons in the hG sheets despite the holey structure.

There are several additional postulations that remain to be exploited experimentally at the composite level as well as at the single graphene sheet level. For example, the hG sheets may be viewed as "graphene nets" that are more flexible than plain sheets, just like the comparison of a netbag vs. a regular bag but at a microscopic scale. In addition, from the viewpoint of matrix-filler interactions, hGs might also be advantageous to intact graphene sheets. For instance, the hole structures might allow polymer penetration or enhanced entanglement sites leading to more enhanced interactions, which could potentially be further improved by hole-edge functionalization.

Figure 10A:
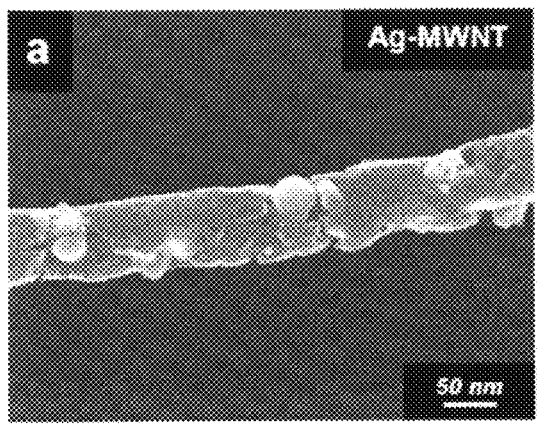
FIG. 10a shows a SEM image showing the catalytic oxidation of MWNTs in air at 300° C. of with 10 mol % Ag.
Figure 10B:
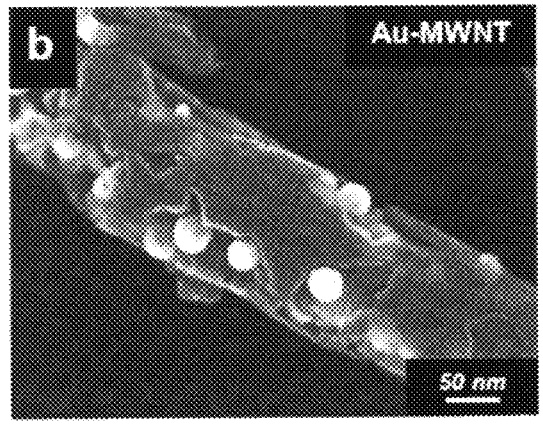
FIG. 10b shows a SEM image showing the catalytic oxidation of MWNTs in air at 300° C. of with 5 mol % Au.
Figure 10C:
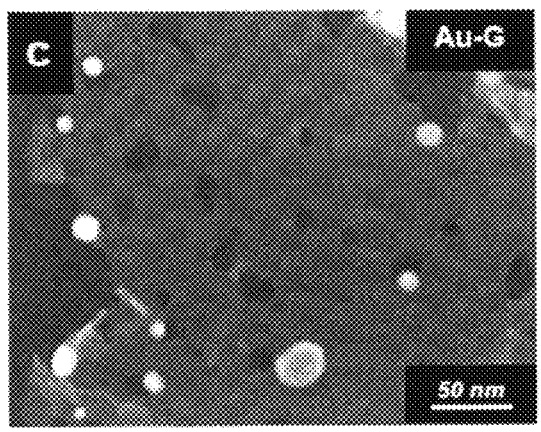
FIG. 10c shows a SEM image showing the catalytic oxidation of graphene in air at 300° C. of with 5 mol % Au.
Figure 10D:
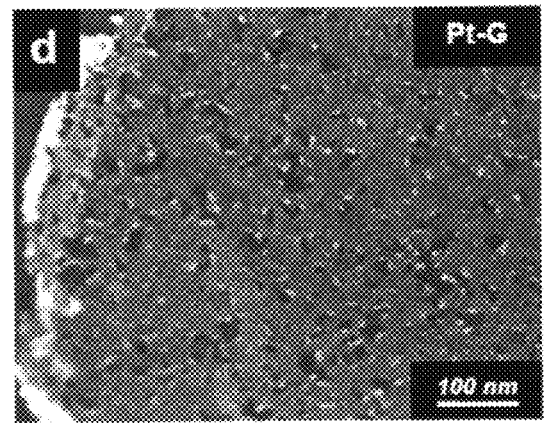
FIG. 10d shows a SEM image showing the catalytic oxidation of graphene in air at 300° C. of with 5 mol % Pt.

The 3-step method to prepare hGs is versatile and applicable to various carbon allotropes since the Ag-catalyzed air oxidation of carbon is not unique to graphene sheets. For example, by heating a Ag nanoparticle-decorated multi-walled carbon nanotube ("MWNT") sample at 300° C. for 3 hours, significant Ag-induced oxidation of the nanotubes is observed (FIG. 10a). This method may also be followed to use these partially oxidized samples to prepare "holey carbon nanotubes". Other materials which can be used in place of the graphene described in the example above include graphene oxide, reduced graphene oxide, thermal exfoliated graphene, graphene nanoribbons, graphite, exfoliated graphite, expanded graphite single-walled carbon nanotubes, double-walled carbon nanotubes, multi-walled carbon nanotubes, carbon nanofibers, carbon fibers, carbon black, amorphous carbon, and fullerenes. In addition, the carbon oxidation catalyst is not restricted to Ag; transition metals including rare earth metals, and their oxides may also be used as the catalyst. The metals from Group VIIIA (Fe, Co, Ni, Ru, Rh, Pd, Os, Ir, and Pt) and Group IB (Cu, Ag, and Au) are especially preferred. Our preliminary experiments showed that Pt and Au nanoparticles are both effective catalysts toward MWNTs and graphene under similar experimental conditions (FIG. 10b-d). More surveys are being conducted on the search for lower cost replacements for the noble metal catalysts.[23] It is interesting to note that some transition metal nanoparticles (such as Fe, Ni, and Co) have been used for graphene surface etching under reductive conditions in hydrogen atmosphere.[29-32] The movements of these nanoparticles on the highly crystalline graphene surface seemed to follow chirality patterns, as similarly observed by Booth et al. on the oxidative etching of suspended graphene by sputtering-deposited Ag nanoparticles.[33] In contrast, the movements of Ag nanoparticles from catalytic oxidative etching of graphene observed in this and other prior work[23,24] are more irregular. As discussed previously, the shapes of the catalytic nanoparticles might have played a significant role in both reductive and oxidative etching conditions. It may be predicted that bulk quantities of holey graphenes with more controlled hole geometry and morphology are obtained by controlling the same for the etching catalysts (Ag or others) deposited onto the graphene sheets followed by either oxidative or reductive etching. The metals can be deposited onto the carbon allotropes in various ways, including but not limited to sputtering, electrochemical deposition, replacement reaction, spontaneous deposition, and solventless deposition. Solventless deposition is especially preferred for bulk preparation. It is preferable to use a metal compound as the precursor. The preferable metal compounds include but are not limited to halides, nitrates, carboxylates, oxalates, acetates, acetylacetonates, and those with any other inorganic or organic functional groups. The preferred range of temperature for carrying out the catalytic oxidation is between 150° C. and 500° C.

Theoretically, the specific surface area (in $m^2g^{-1}$) of a hG sheet should be the same as an intact graphene sheet. However, it is known that the actual surface area of carbon nanomaterials is strongly affected by post-processing methods.[34-38] In the current study, the starting graphene sample is from a thermal exfoliation process and thus very lightweight and fluffy with a reasonably high specific surface area of ~590 $m^2g^{-1}$ measured from the nitrogen adsorption-desorption isotherms using the Brunauer-Emmett-Teller (BET) method. However, post-processing procedures, such as short-term refluxing in nitric acid (with followed work-up steps such as centrifugation, washing, and drying), significantly densify the sample resulting in the reduction of the BET surface area value (e.g. 370 $m^2g^{-1}$ for a graphene sample after 2 hours reflux in 2.6 M $HNO_3$). The hG samples prepared in this work are processed under similar conditions. They had measured BET surface area values in the range of ~280-380 $m^2g^{-1}$, which can thus be considered similar to the starting graphene samples. There is no doubt this value can be significantly improved with proper physical/physiochemical treatments (such as freeze drying,[34] chemical activation,[35,36] and other pore-generation techniques[37,38]) on the products, which may then allow full access of the porous (holey) graphitic surfaces for applications such as energy storage, gas storage, and catalyst substrates. Our preliminary experiments (see FIGS. 13a and 13b) did show that the hG sheets might be a better choice of electrode platform for supercapacitors than the intact starting graphene sheets. It is possible that the hG sheets allow improved ion transport from the presence of the holes in the electrode consisting of stacked sheets, which was also similarly suggested previously by Kung and co-workers in the use of hG papers for lithium ion batteries.[15,16] Nevertheless, much improvement in the capacitance values as well as specific power/energy of such energy storage devices are expected once optimizations of hole size and density, specific surface area, added functionalities (especially at the hole edges), and electrode architectures are achieved on these novel materials.

The method disclosed herein is a straightforward procedure to controllably prepare hG sheets with holes of various sizes. The 3-step procedure includes the deposition of Ag nanoparticles onto graphene sheets, the Ag-catalyzed oxidation of graphene in air under elevated temperature (typically at 300° C.), and the refluxing with dilute nitric acid to remove Ag catalysts. By adjusting the Ag catalyst loading level, the hole sizes of the hG sheet products could be tuned in a wide range (average diameter from ~5 to tens of nm demonstrated in current work). The air oxidation temperature and time duration in the second step and the intensity of the acid treatment in the last step may also affect the hole morphology of the final hG sheets. The procedure was found highly scalable and used to produce multiple grams of hG sheets routinely. It is important that the hG sheets, despite their holey structures, largely retain the two-dimensional graphitic crystallinity as evidenced from a combination of microscopic and spectroscopic analyses. Therefore, the hG sheets have preserved the important properties of intact graphene sheets such as electrical, thermal, and mechanical properties. This finding has profound implications on the potential applications of hGs. For example, the preliminary experiments show that the hG sheets are better reinforcements for polymer composites than the starting intact graphene sheets due to their lower volume density but retained mechanical strength, as well as possible contributions from their unique "graphene net"-like structures in addition to enhanced matrix-filler interactions with the presence of the holes. The conductive nature of hG sheets and their porous structure may allow them to be used as advanced electrode materials in energy storage applications, for which more detailed research is currently underway.

Experimental Details

Materials. Silver (I) acetate (99%) was purchased from Aldrich Chemical Company. Graphene powder (Vor-X; grade: reduced 070; lot: BK-77x) was provided by Vorbeck Materials. MWNTs (batch# UK115b) with a diameter range of ~20-150 nm were purchased from the University of Kentucky. Ultem™ 1000 was obtained from GE Plastics. All materials and chemicals were used as received.

Measurements. SEM and TEM images were acquired using a Hitachi S-5200 field-emission SEM system under the secondary electron (SE) and transmitted electron (TE) modes, respectively. Electron diffraction patterns and the corresponding TEM images were acquired on a JEOL 2000 field-emission TEM system. XRD analysis were conducted on a Siemens D5000 X-ray diffractometer with Cu K$\alpha$ as the radiation source ($\lambda$=1.5418 Å). XPS spectra were obtained on a ThermoFisher ESCAlab 250 X-ray Photoelectron Spectrometer. Raman spectra were acquired on a Thermo-Nicolet-Almega Dispersive Raman Spectrometer equipped with excitation lasers with wavelengths of 532 and 785 nm. BET surface area measurements were conducted on a Quantachrome Nova 2200e Surface Area and Pore Size Analyzer system. Thermogravimetric (TGA) and differential thermogravimetric (DTG) traces were obtained on a Seiko TG/DTA 220 (SSC/5200) system. Polymer ribbons specimens were cut into strips of ~5 cm×5 mm for mechanical tests, which were conducted at room temperature using at least 5 specimens on an Instron 5848 Microtester at a gauge length and a crosshead speed at 20 mm and 10 mm min$^{-1}$, respectively.

Step I—Catalyst Deposition: Ag Nanoparticle-Decorated Graphene (Ag—G). The procedure was similar to that for Ag nanoparticle-decorated MWNTs as reported elsewhere.[20] In a typical reaction, the as-obtained graphene powder (100 mg) and silver acetate powder of the desired ratio (1 or 10 mol % Ag-to-C, corresponding to ~9 or ~47 wt %) were mechanically mixed for 5 min using a zirconia vial-ball set (SPEX CertiPrep, ~20 cm$^3$ mixing load, 2 balls) with a SPEX CertiPrep 8000D high-energy shaker mill. The solid mixture was then transferred to an appropriate container (e.g. an aluminum pan or a glass beaker) and heated in a nitrogen oven (Blue M Electric A-5245-Q Inert Gas Oven; nitrogen flow rate ~60-80 cm$^3$min$^{-1}$) to 350° C. over 1 hour and held isothermally for 3 hours. The product was then collected as the (Ag—G)$_1$ or (Ag—G)$_{10}$ sample (the subscript corresponded to the Ag-to-C molar ratio in percentage).

Step II—Catalytic Oxidation: Air-Oxidized Ag—G. In a typical reaction, a Ag—G sample (100 mg) from Step I was heated in air using a open-ended tube furnace or an air oven to a given temperature (250-400° C.) over ~1 hour and held isothermally for 3 hours.

Step III—Catalyst Removal: Holey Graphene (hG). In a typical reaction, an air-oxidized Ag—G sample (50 mg) was refluxed in diluted nitric acid (2.6 M, 30 mL) for 2 hours to remove Ag. Upon cooling, the slurry was centrifuged and the supernatant was discarded. The solid was then repeatedly washed with water in up to ten more redispersion—centrifugation cycles until the supernatant reached neutral (pH>6). The solid was then carefully dried to obtain the final hG product. Typical overall yields in terms of carbon weight were approximately 80% and 68% for hG$_1$ and hG$_{10}$ samples (air oxidation at 300° C. for 3 h), respectively.

Ultem-Based Nanocomposites. Ultem was used as the polymer matrix to blend with graphene and hG samples at 1 wt % for the subsequent melt processing into nanocomposites. The mixing equipment used was a 30 mL half sized mixer equipped with roller blades (C. W. Brabender) attached to a RS7500 drive/data collection system (Rheometer Services). Each sample was processed for 150 min at 325° C. and 25 rpm with no purge gas. The mixtures were then put through a chopper/grinder equipped with a mesh screen (hole diameter ~4.76 mm). For ribbon fabrication, the melt-processed mixtures were extruded through a Laboratory Mixing Extruder (Dynisco LME) at a rotor temperature of 190° C. and a head (0.38 mm×19.1 mm) temperature of 350° C. for both the blank Ultem sample and the nanocomposites with 1 wt % graphene or hG fillers.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

LIST OF REFERENCES (1) Geim, A. K. Graphene: Status and Prospects. *Science* 2009, 324, 1530.
(2) Allen, M. J.; Tung, V. C.; Kaner, R. B. Honeycomb Carbon: A Review of Graphene. *Chem. Rev.* 2010, 110, 132.
(3) Zhu, Y.; Murali, S.; Cai, W.; Li, X.; Suk, J. W.; Potts, J. R.; Ruoff, R. S. Graphene and Graphene Oxide: Synthesis, Properties, and Applications. *Adv. Mater.* 2010, 22, 3906.
(4) Dai, L. Functionalization of Graphene for Efficient Energy Conversion and Storage. *Acc. Chem. Res.* 2013, 46, 31.
(5) Banhart, F.; Kotakoski, J.; Krasheninnikov, A. V. Structural Defects in Graphene. *ACS Nano* 2011, 5, 26.
(6) Terrones, H.; Lv, R. T.; Terrones, M.; Dresselhaus, M. S. The Role of Defects and Doping in 2D Graphene Sheets and 1D Nanoribbons. *Rep. Prog. Phys.* 2012, 75, 062501.
(7) Bai, J.; Zhong, X.; Jiang, S.; Huang, Y.; Duan, X. Graphene Nanomesh. *Nat. Nanotechnol.* 2010, 5, 190.
(8) Sinitskii, A.; Tour, J. M. Patterning Graphene through the Self-Assembled Templates: Toward Periodic Two-Dimensional Graphene Nanostructures with Semiconducting Properties. *J. Am. Chem. Soc.* 2010, 132, 14730.
(9) Liang, X.; Jung, Y.-S.; Wu, S.; Ismach, A.; Olynick, D. L.; Cabrini, S.; Bokor, J. Formation of Bandgap and Subbands in Graphene Nanomeshes with Sub-10 nm Ribbon Width Fabricated via Nanoimprint Lithography. *Nano Lett.* 2010, 10, 2454.
(10) Akhavan, O. Graphene Nanomesh by ZnO Nanorod Photocatalysts. ACS Nano 2010, 4, 4174.
(11) Zeng, Z.; Huang, X.; Yin, Z.; Li, H.; Chen, Y.; Li, H.; Zhang, Q.; Ma, J.; Boey, F.; Zhang, H. Fabrication of Graphene Nanomesh by Using an Anodisc Aluminum Oxide Membrane as a Template. *Adv. Mater.* 2012, 24, 4138.
(12) Liu, J.; Cai, H.; Yu, X.; Zhang, K.; Ji, X.; Li, J.; Pan, N.; Shi, Q.; Luo, Y.; Wang, X. Fabrication of Graphene Nanomesh and Improved Chemical Enhancement for Raman Spectroscopy. *J. Phys. Chem. C* 2012, 116, 15741.
(13) Paul, R. K.; Badhulika, S.; Saucedo, N. M.; Mulchandani, A. Graphene Nanomesh as Highly Sensitive Chemiresistor Gas Sensor. Anal. Chem. 2012, 84, 8171.
(14) Wang, M.; Fu, L.; Gan, L.; Zhang, C.; Rummeli, M.; Bachmatiuk, A.; Huang, K.; Fang, Y.; Liu, Z. CVD Growth of Large Area Smooth-Edged Graphene Nanomesh by Nanosphere Lithography. *Sci. Rep.* 2013, 3, 1238.

(15) Zhao, X.; Hayner, C. M.; Kung, M. C.; Kung, H. H. Flexible Holey Graphene Paper Electrodes with Enhanced Rate Capability for Energy Storage Applications. *ACS Nano* 2011, 5, 8739.

(16) Zhao, X.; Hayner, C. M.; Kung, M. C.; Kung, H. H. In-Plane Vacancy-Enabled High-Power Si-Graphene Composite Electrode for Lithium-Ion Batteries. *Adv. Energy Mater.* 2011, 1, 1079.

(17) Kotchey, G. P.; Allen, B. L.; Vedala, H.; Yanamala, N.; Kapralov, A. A.; Tyurina, Y. Y.; Klein, Seetharaman, J.; Kagan, V. E.; Star A. The Enzymatic Oxidation of Graphene Oxide. ACS *Nano* 2011, 5, 2098.

(18) Han, T. H.; Huang, Y.-K.; Tan, A. T. L.; Dravid, V. P.; Huang, J. Steam Etched Porous Graphene Oxide Network for Chemical Sensing. *J. Am. Chem. Soc.* 2011, 133, 15264.

(19) Schniepp, H. C.; Li, J.-L.; McAllister, M. J.; Sai, H.; Herrera-Alonso, M.; Adamson, D. H.; Prud'homme, R. K.; Car, R.; Saville, D. A.; Aksay, I. A., Functionalized Single Graphene Sheets Derived from Splitting Graphite Oxide. *J. Phys. Chem. B* 2006, 110, 8535.

(20) Lin, Y.; Watson, K. A.; Fallbach, M. J.; Ghose, S.; Smith, J. G.; Delozier, D. M.; Cao, W.; Crooks, R. E.; Connell, J. W. Rapid, Solventless, Bulk Preparation of Metal Nanoparticle-Decorated Carbon Nanotubes. *ACS Nano* 2009, 3, 871.

(21) Lin, Y.; Watson, K. A.; Ghose, S.; Smith, J. G.; Williams, T. V.; Crooks, R. E.; Cao, W.; Connell, J. W. Direct Mechanochemical Formation of Metal Nanoparticles on Carbon Nanotubes. *J. Phys. Chem. C* 2009, 113, 14858.

(22) Lin, Y.; Baggett, D. W.; Kim, J.-W.; Siochi, E. J.; Connell, J. W. Instantaneous Formation of Metal and Metal Oxide Nanoparticles on Carbon Nanotubes and Graphene via Solvent-Free Microwave Heating. *ACS Appl. Mater. Interfaces* 2011, 3, 1652.

(23) Adair, R. R.; Boult, E. H.; Freeman, E. M.; Jasienko, S.; Marsh, H. Catalytic Gasification of Doped Carbon—A Microscopic Study. *Carbon* 1971, 9, 763.

(24) Severin, N.; Kirstein, S.; Sokolov, I. M.; Rabe, J. P. Rapid Trench Channeling of Graphenes with Catalytic Silver Nanoparticles. *Nano Lett.* 2009, 9, 457.

(25) Lineberry, Q. J.; Cao, Y.; Lin, Y.; Ghose, S.; Connell, J. W.; Pan, W.-P. Mercury Capture from Flue Gas Using Palladium Nanoparticle-Decorated Substrates as Injected Sorbent. *Energy Fuels* 2009, 23, 1512.

(26) Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari A. C.; Coleman, J. N. High-Yield Production of Graphene by Liquid-Phase Exfoliation of Graphene. *Nat. Nanotechnol.* 2008, 3, 563.

(27) Warner, J. H.; Rummeli, M. H.; Gemming, T.; Buchner, B.; Briggs, G. A. D. Direct Imaging of Rotational Stacking Faults in Few Layer Graphene. *Nano Lett.* 2009, 9, 102.

(28) Ghose, S.; Working, D. C.; Connell, J. W.; Smith, J. G.; Watson, K. A.; Delozier, D. M.; Sun, Y.-P.; Lin, Y. Thermal Conductivity of Ultem™/Carbon Nanofiller Blends. *High Perform. Polym.* 2006, 18, 961.

(29) Datta, S. S.; Strachan, D. R.; Khamis, S. M.; Johnson, A. T. C. Crystallographic Etching of Few-Layer Graphene. *Nano Lett.* 2008, 8, 1912.

(30) Ci, L.; Xu, Z.; Wang, L.; Gao, W.; Ding, F.; Kelly, K. F.; Yakobson, B. I.; Ajayan, P. M. Controlled Nanocutting of Graphene. *Nano Res.* 2008, 1, 116.

(31) Ci, L.; Song, L.; Jariwala, D.; Elias, A. L.; Gao, W.; Terrones, M.; Ajayan, P. M. Graphene Shape Control by Mulfistage Cutting and Transfer. *Adv. Mater.* 2009, 21, 4487.

(32) Elias, A. L.; Botello-Mendez, A. R.; Meneses-Rodriguez, D.; Gonzalez, V. J.; Ramirez-Gonzalez, D.; Ci, L.; Munoz-Sandoval, E.; Ajayan, P. M.; Terrones, H.; Terrones, M. Longitudinal Cutting of Pure and Doped Carbon Nanotubes to Form Graphitic Nanoribbons Using Metal Clusters as Nanoscalpels. *Nano Lett.* 2010, 10, 366.

(33) Booth, T. J.; Pizzocchero, F.; Anderson, H.; Hansen, T. W.; Wagner, J. B.; Jinschek, J. R.; Dunin-Borkowski, R. E.; Hansen, O.; Boggild, P. Discrete Dynamics of Nanoparticle Channelling in Suspended Graphene. *Nano Lett.* 2011, 11, 2689.

(34) Zhang, X.; Sui, Z.; Xu, B.; Yue, S.; Luo, Y.; Zhan, W.; Liu, B. Mechanically Strong and Highly Conductive Graphene Aerogel and Its Use as Electrodes for Electrochemical Power Sources. *J. Mater. Chem.* 2011, 21, 6494.

(35) Zhu, Y.; Murali, S.; Stoller, M. D.; Ganesh, K. J.; Cai, W.; Ferreira, P. J.; Pirkle, A.; Wallace, R. M.; Cychosz, K. A.; Thommes, M.; Su, D.; Stach, E. A.; Ruoff, R. S. Carbon-Based Supercapacitors Produced by Activation of Graphene. *Science* 2011, 332, 1537.

(36) Zhang, L.; Zhao, X.; Stoller, M. D.; Zhu, Y.; Ji, H.; Murali, S.; Wu, Y.; Perales, S.; Clevenger, B.; Ruoff, R. S. Highly Conductive and Porous Activated Reduced Graphene Oxide Films for High-Power Supercapacitors. *Nano Lett.* 2012, 12, 1806.

(37) Choi, B. G.; Yang, M.; Hong, W. H.; Choi, J. W.; Huh, Y. S. 3D Macroporous Graphene Frameworks for Supercapacitors with High Energy and Power Densities. *ACS Nano* 2012, 6, 4020.

(38) El-Kady, M. F.; Strong, V.; Dubin, S.; Kaner, R. B. Laser Scribing of High-Performance and Fleixble Graphene-Based Electrochemical Capacitors. *Science* 2012, 335, 1326.

What is claimed is:

1. A method for forming a holey carbon allotrope, comprising:
    providing a carbon allotrope in solid form;
    depositing carbon oxidation catalyst nanoparticles on the surface of the carbon allotrope sheet in a facile, controllable, and solvent-free process to yield a carbon oxidation catalyst-carbon allotrope material;
    subjecting the resulting carbon oxidation catalyst-carbon allotrope material to a thermal treatment in air;
    selectively oxidizing the carbons in contact with the carbon oxidation catalyst nanoparticles into gaseous byproducts; and
    removing the carbon oxidation catalyst nanoparticles such that the holes remain in the surface of the carbon allotrope and penetrate completely therethrough.

2. The method of claim 1 wherein the carbon allotrope is selected from the group consisting of graphene. graphene oxide, reduced graphene oxide, thermal exfoliated graphene, graphene nanoribbons, graphite, exfoliated graphite, expanded graphite, single-walled carbon nanotubes, double-walled carbon nanotubes, multi-walled carbon nanotubes, carbon nanofibers, carbon fibers, carbon black. amorphous carbon, fullerenes and combinations thereof.

3. The method of claim 1 wherein the carbon oxidation catalyst is selected from the group consisting of transition metals, rare earth metals, oxides, and combinations thereof.

4. The method of claim 1 wherein the carbon oxidation catalyst is selected from the group consisting of Fe, Co, Ni, Ru, Rh, Pd, Os, Ir, Pt, Cu, Ag, and Au.

5. The method of claim 1 wherein the carbon oxidation catalyst nanoparticle-carbon allotrope is prepared by heating a mixture of a metal salt precursor and a carbon allotrope at an elevated temperature whereby the metal salt precursor is decomposed in an inert atmosphere.

6. The method of claim 5 wherein the elevated temperature is between 100 to 500° C.

7. The method of claim 5 wherein the heating is provided by energy input that is in a form selected from the group consisting of thermal, electrical, mechanochemical, electrochemical, electron bombardment, ion bombardment, electromagnetic, and combinations thereof.

8. The method of claim 5 wherein the elevated temperature is 350° C.

9. The method of claim 5 wherein the metal salt precursor is a compound with organic groups.

10. The method of claim 5 wherein, the metal salt precursor is a compound with inorganic groups.

11. The method of claim 5 wherein the metal salt precursor is selected from the group consisting of metal acetate, metal acetylacetonate, metal nitrate, metal halides, and combinations thereof.

12. The method of claim 1 wherein the carbon oxidation catalyst nanoparticle is in a concentration of between 0.1 mol % and 20 mol %.

13. The method of claim 1 wherein the oxidation step occurs at a temperature between 150° C. and 500° C.

14. The method of claim 1 wherein the carbon oxidation catalyst nanoparticles are removed by treatment in acid at temperatures between ambient and the temperature to reflux the acid.

15. The method of claim 13 wherein the acid is selected from the group consisting of nitric acid, hydrochloric acid, sulfuric acid, acetic acid, chlorosulfonic acid, phosphorous acid and combinations thereof.

16. A method for forming holey graphene, comprising:
providing a graphene sheet;
depositing Ag nanoparticles on the surface of the graphene sheet in a facile, controllable, and solvent-free process to yield an Ag—G material;
subjecting the resulting Ag—G material to a thermal treatment in air; and selectively oxidizing the graphitic carbon atoms in contact with the Ag nanoparticles into gaseous byproducts; and
removing the Ag nanoparticles such that the holes remain in the surface of the graphene sheet and penetrate completely therethrough.

17. The method of claim 16 wherein the thermal treatment occurs at a temperature of 350° C.

18. The method of claim 16 wherein the Ag nanoparticles are in the form of metallic silver.

19. The method of claim 16 wherein the oxidation step occurs at a temperature between 250° C. and 400° C.

20. The method of claim 16 wherein the oxidation step occurs at a temperature of 300° C.

21. The method of claim 18 wherein the metallic silver is in the concentration of between 0.1 mol % and 20 mol %.

22. The method of claim 16 wherein the Ag nanoparticles are removed by treatment in diluted nitric acid at temperatures between ambient and the temperature to reflux the acid.

23. The method of claim 16 wherein the resulting holey graphene is incorporated into an electrode as a platform for an electrochemical device.

* * * * *